US012744006B2

(12) United States Patent
Yun

(10) Patent No.: US 12,744,006 B2
(45) Date of Patent: Sep. 22, 2026

(54) DISPLAY DEVICE HAVING A PLURALITY OF VOLTAGE LINES IN A BEZEL AREA AND DRIVING METHOD THEREOF

(71) Applicant: LG Display Co., Ltd., Seoul (KR)

(72) Inventor: JaeKyeong Yun, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/774,096

(22) Filed: Jul. 16, 2024

(65) Prior Publication Data

US 2025/0037664 A1 Jan. 30, 2025

(30) Foreign Application Priority Data

Jul. 27, 2023 (KR) ........................ 10-2023-0098307

(51) Int. Cl.
*G09G 3/3258* (2016.01)

(52) U.S. Cl.
CPC ... *G09G 3/3258* (2013.01); *G09G 2300/0842* (2013.01); *G09G 2330/021* (2013.01)

(58) Field of Classification Search
CPC .................................................... G09G 3/3258
USPC ......................................................... 345/204
See application file for complete search history.

(56) References Cited

U.S. PATENT DOCUMENTS

2009/0121984 A1 5/2009 Yamamoto et al.
2012/0105421 A1* 5/2012 Tsai ..................... G09G 3/3233 345/212
2013/0328753 A1* 12/2013 Tsuge ................... G09G 3/3233 345/77
2018/0102092 A1* 4/2018 Kubota ................ G09G 3/3233
2018/0190197 A1* 7/2018 Chang ................ H10K 59/1216
2021/0233968 A1* 7/2021 Yang .................... H10K 59/353
2021/0358411 A1* 11/2021 Wen ..................... G09G 3/3258
2021/0366388 A1* 11/2021 Song .................... G09G 3/3233
2021/0390900 A1* 12/2021 Xi ............................ G09G 3/32
2021/0399056 A1* 12/2021 Wang ................... H10K 50/865

FOREIGN PATENT DOCUMENTS

CN 109036279 A 12/2018
KR 10-2023-0034844 A 3/2023

(Continued)

OTHER PUBLICATIONS

Office Action issued on May 9, 2025 from counterpart TW application No. 113123872 with English translation.

(Continued)

*Primary Examiner* — Long D Pham
(74) *Attorney, Agent, or Firm* — Morgan, Lewis & Bockius LLP

(57) ABSTRACT

The present disclosure relates to a display device and a driving method of the display device that are capable of stabilizing the threshold voltage of a driving transistor. The display device may include a display area and a bezel area. First and second switches may be disposed in the bezel area. The first switch may be connected between a first voltage line and a first subpixel, and the second switch may be connected between a second voltage line and the first subpixel. During an initialization period, the first switch may be turned on to supply a first voltage to the first subpixel, and during an emission period, the second switch may be turned on to supply a second voltage to the first subpixel.

21 Claims, 27 Drawing Sheets

(56) References Cited

FOREIGN PATENT DOCUMENTS

| | | |
|---|---|---|
| TW | 201606735 A | 2/2016 |
| TW | 202020842 A | 6/2020 |

OTHER PUBLICATIONS

2nd Office Action issued on Oct. 17, 2025 from counterpart TW application No. 113123872 (Note: CN109036279A, TW202020842A and TW201606735A cited therein are already of record. ).

* cited by examiner

DISPLAY DEVICE HAVING A PLURALITY OF VOLTAGE LINES IN A BEZEL AREA AND DRIVING METHOD THEREOF

CROSS-REFERENCE TO RELATED APPLICATION

This application claims the benefit of and priority to Korea Patent Application No. 10-2023-0098307, filed on Jul. 27, 2023, the entirety of which is incorporated herein by reference for all purposes as if fully set forth herein.

TECHNICAL FIELD

The present disclosure generally relates to electronic devices with displays, and particularly to, for example, without limitation, a display device and a method of driving the display device.

BACKGROUND

As the information-oriented society has been developed, various needs for display devices for displaying images have increased. Recently, various types of display devices, such as liquid crystal display (LCD) devices, organic light emitting diode (OLED) display devices, and the like have been developed and widely used.

In order to increase pixels per inch (PPI), which represents the number of pixels in 1 inch, it is desirable to further increase circuit integration of a display panel.

A display panel may include driving transistors for driving light emitting elements.

When a driving transistor is driven, a body voltage may be supplied to the body of the driving transistor. In this situation, a body effect may occur depending on body voltages.

The foregoing description should not be assumed to be prior art merely because it is mentioned in or associated with this section. The foregoing description may include information that describes one or more aspects of the subject technology, and the description in this section does not limit the invention.

SUMMARY

The inventor of the present disclosure has recognized the problems and disadvantages of the related art and have performed extensive research and experiments. The inventor of the present disclosure has thus invented a new display device and a new method of driving the display device that substantially obviate one or more problems due to limitations and disadvantages of the related art.

In one or more aspects, in order to improve circuit integration of a display panel, it is desirable to reduce the number of elements disposed on the display panel.

In addition, when a body voltage is supplied to a driving transistor, the threshold voltage of the driving transistor may vary due to the body effect.

In order to address these issues, one or more aspects of the present disclosure may provide a display device capable of stably controlling threshold voltages of driving transistors, and a driving method of the display device.

One or more aspects of the present disclosure may provide a display device capable of enabling circuits disposed in a display panel to be configured with improved integration, and a driving method of the display device.

One or more aspects of the present disclosure may provide a display device capable of being driven with low power consumption by enabling circuits disposed in a display panel to be configured with improved integration, and a driving method of the display device.

According to one or more aspects of the present disclosure, a display device may be provided that includes a display area in which a plurality of subpixels including a first subpixel are disposed, a bezel area different from the display area, a plurality of voltage lines disposed in the bezel area and including at least one driving voltage line and at least one base voltage line, and first and second switches disposed in the bezel area, the first switch being electrically connected between the base voltage line and the first subpixel, and the second switch being electrically connected between a first voltage line among the plurality of voltage lines and the first subpixel.

According to one or more aspects of the present disclosure, a driving method of a display device may include providing an initialization period during which a first switch disposed in a bezel area is turned on, and a first voltage is supplied to a first subpixel disposed in a display area, and providing an emission period during which a second switch disposed in the bezel area is turned on, a second voltage is supplied to the first subpixel, and the first subpixel emits light.

According to one or more aspects of the present disclosure, a display device and a driving method of the display device may be provided that are capable of stably controlling threshold voltages of driving transistors.

According to one or more aspects of the present disclosure, a display device and a driving method of the display device may be provided that are capable of enabling circuits disposed in a display panel to be configured with improved integration.

According to one or more aspects of the present disclosure, a display device and a driving method of the display device may be provided that are capable of being driven with low power consumption by enabling circuits disposed in a display panel to be configured with improved integration.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the appended drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles and examples of the disclosure. In the drawings.

Figure 1:
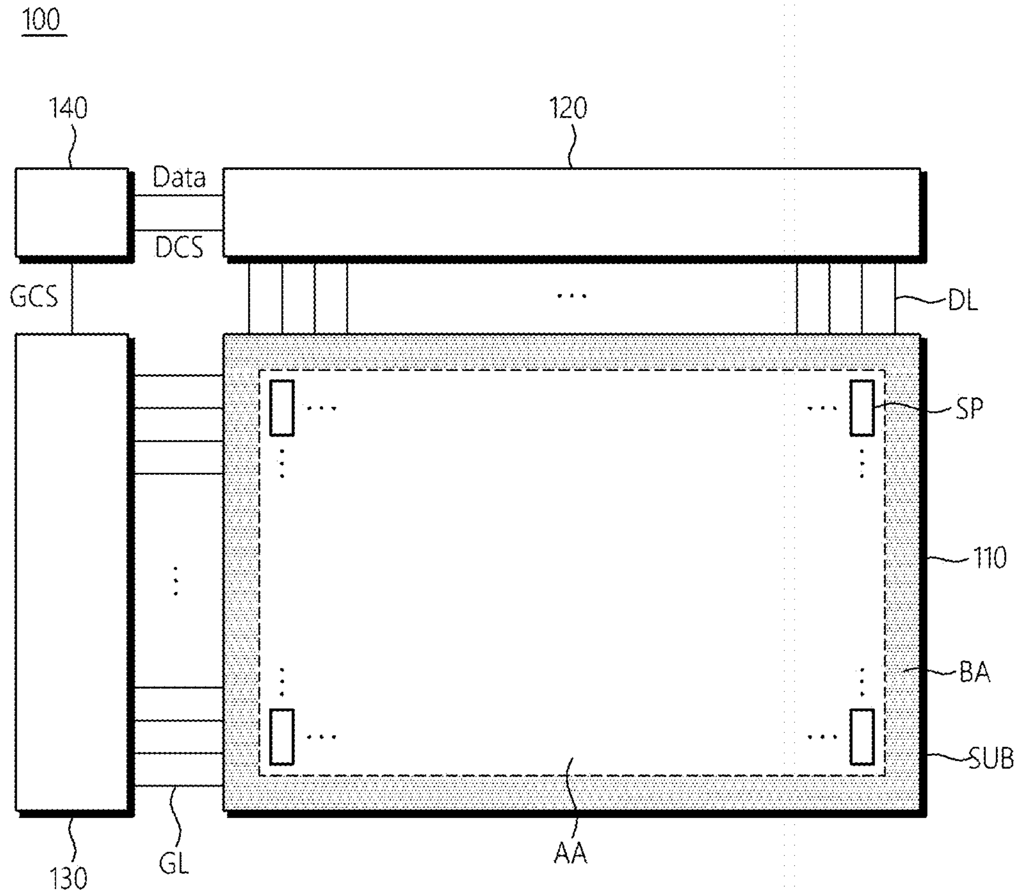
FIG. 1 illustrates an example system configuration of a display device according to aspects of the present disclosure.

Throughout the drawings and the detailed description, unless otherwise described, the same drawing reference numerals should be understood to refer to the same or similar elements, features, and structures. The sizes, lengths, and thicknesses of layers, regions and elements, and depiction thereof may be exaggerated for clarity, illustration, and/or convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term “comprise,” “have,” “include,” “contain,” “constitute,” “made of,” “formed of,” “composed of,” or the like is used with respect to one or more elements (e.g., layers, films, regions, components, sections, members, parts, regions, areas, portions, steps, operations, and/or the like), one or more other elements may be added unless a term such as “only” or the like is used. The terms used in the present disclosure are merely used in order to describe particular example embodiments, and are not intended to limit the scope of the present disclosure. The terms of a singular form may include plural forms unless the context clearly indicates otherwise. The word “exemplary” is used to mean serving as an example or illustration. Embodiments are example embodiments. Aspects are example aspects. “Embodiments,” “examples,” “aspects,” and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term “may” encompasses all the meanings of the term “can.”

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

When a positional relationship between two elements (e.g., layers, films, regions, components, sections, members, parts, regions, areas, portions, and/or the like) are described using any of the terms such as “on,” “on a top of,” “upon,” “on top of,” “over,” “under,” “above,” “upper,” “below,”

"lower," "beneath," "near," "close to," "adjacent to," "beside," "next to," "at or on a side of," and/or the like indicating a position or location, one or more other elements may be located between the two elements unless a more limiting term, such as "immediate(ly)," "direct(ly)," or "close(ly)," is used. For example, when an element and another element are described using any of the foregoing terms, this description should be construed as including a case in which the elements contact each other directly as well as a case in which one or more additional elements are disposed or interposed therebetween. Furthermore, the spatially relative terms such as the foregoing terms as well as other terms such as "front," "rear," "back," "left," "right," "top," "bottom," "downward," "upward," "up," "down," "column," "row," "vertical," "horizontal," "diagonal," and the like refer to an arbitrary frame of reference. For example, these terms may be used for an example understanding of a relative relationship between elements, including any correlation as shown in the drawings. However, embodiments of the disclosure are not limited thereby or thereto. The spatially relative terms are to be understood as terms including different orientations of the elements in use or in operation in addition to the orientation depicted in the drawings or described herein. For example, where a lower element or an element positioned under another element is overturned, then the element may be termed as an upper element or an element positioned above another element. Thus, for example, the term "under" or "beneath" may encompass, in meaning, the term "above" or "over." An example term "below" or the like, can include all directions, including directions of "below," "above" and diagonal directions. Likewise, an example term "above," "on" or the like can include all directions, including directions of "above," "on," "below" and diagonal directions.

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., layers, films, regions, components, sections, members, parts, regions, areas, portions, steps, operations, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, member, part, region, area, portion, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, member, part, region, area, portion, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, member, part, region, area, portion, or the like) is "provided," "disposed," "connected," "coupled," or the like in, on, with or to another element may be understood, for example, as that at least a portion of the element is provided, disposed, connected, coupled, or the like in, on, with or to at least a portion of another element. The phrase "through" may be understood, for example, to be at least partially through or entirely through. The phase that an element (e.g., layer, film, region, component, section, member, part, region, area, portion, or the like) "contacts," "overlaps," or the like with another element may be understood, for example, as that at least a portion of the element contacts, overlaps, or the like with a least a portion of another element.

The terms such as a "line" or "direction" should not be interpreted only based on a geometrical relationship in which the respective lines or directions are parallel, perpendicular, diagonal, or slanted with respect to each other, and may be meant as lines or directions having wider directivities within the range within which the components of the present disclosure may operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, section, member, part, region, area, portion, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise. In one or more aspects, unless stated otherwise, the term "n-th" may refer to "n-nd" (e.g., 2nd where n is 2), or "n-rd" (e.g., 3rd where n is 3), and n may be a natural number.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

FIG. 1 illustrates an example system configuration of a display device 100 according to aspects of the present disclosure.

Referring to FIG. 1, the display device 100 may include a display panel 110 and at least one driving circuit for driving the display panel 110.

The display panel 110 may include, for example, a silicon material. In an example where the display panel 110 includes the silicon material and organic light emitting elements such as organic light emitting diodes (OLED), this display panel 110 may be referred to as an OLED-on-silicon (OLEDoS) panel. The display panel 110 may also include glass.

The display panel 110 may include a plurality of signal lines such as a plurality of data lines DL and a plurality of gate lines GL, and include a plurality of subpixels SP. The display panel 110 may include a display area AA allowing an image to be displayed, and a bezel area BA in which an image is not displayed. A plurality of subpixels SP for displaying an image may be disposed in the display area AA of the display panel 110. Driving circuits (120, 130, and 140) may be electrically connected to, or mounted on, the bezel area BA of the display panel 110. Further, a pad portion to which at least one integrated circuit or at least one printed circuit board are connected may be disposed in the bezel area BA of the display panel 110.

The at least one driving circuit may include a data driving circuit 120, a gate driving circuit 130, and the like, and further include a controller 140 for controlling the data driving circuit 120 and the gate driving circuit 130.

The data driving circuit 120 may be a circuit for driving a plurality of data lines DL, and can supply data signals to the plurality of data lines DL. The gate driving circuit 130 may be a circuit for driving a plurality of gate lines GL, and can supply gate signals to the plurality of gate lines GL.

The gate driving circuit 130 can supply a gate signal of a turn-on level voltage or a gate signal of a turn-off level voltage according to the control of the controller 140. The gate driving circuit 130 can sequentially drive a plurality of gate lines GL by sequentially supplying gate signals of the turn-on level voltage to the plurality of gate lines GL.

The controller 140 can supply a data control signal DCS to the data driving circuit 120 to control an operation timing of the data driving circuit 120. The controller 140 can supply a gate control signal GCS to the gate driving circuit 130 to control an operation timing of the gate driving circuit 130.

The controller 140 can start to scan pixels according to respective timings set in each frame, convert image data inputted from external devices or external image providing sources (e.g. host systems) in a data signal form readable by the data driving circuit 120 and then supply image data Data resulting from the converting to the data driving circuit 120, and in line with the scan of at least one pixel (or at least one pixel array) among the pixels, control the loading of the image data to the at least one pixel at a time at which the illumination of at least one corresponding light emitting element of the at least one pixel is intended.

In order to control the data driving circuit 120 and the gate driving circuit 130, the controller 140 can receive timing signals such as a vertical synchronization signal VSYNC, a horizontal synchronization signal HSYNC, an input data enable signal DE, a clock signal CLK, and the like, generate several types of control signals (DCS, GCS, and/or the like), and output the generated signals to the data driving circuit 120 and the gate driving circuit 130.

The controller 140 may be implemented in a separate component from the data driving circuit 120, or integrated with the data driving circuit 120, so that the controller 140 and the data driving circuit 120 can be implemented in a single integrated circuit.

The data driving circuit 120 can drive a plurality of data lines DL by supplying data voltages corresponding to image data Data received from the controller 140 to the plurality of data lines DL. The data driving circuit 120 may also be referred to as a source driving circuit. The data driving circuit 120 may include, for example, one or more source driver integrated circuits SDIC. Each source driver integrated circuit SDIC may include a shift register, a latch circuit, a digital-to-analog converter DAC, an output buffer, and the like. In one or more example embodiments, each source driver integrated circuit SDIC may further include an analog-to-digital converter ADC.

In one or more example embodiments, each source driver integrated circuit SDIC may be connected to the display panel 110 using a tape-automated-bonding (TAB) technique, or connected to a conductive pad such as a bonding pad of the display panel 110 using a chip-on-glass (COG) technique or a chip-on-panel (COP) technique, or implemented in the display panel 110 using a chip-on-film (COF) technique.

In one or more example embodiments, the gate driving circuit 130 may be connected to the display panel 110 using the tape-automated-bonding (TAB) technique, or connected to a conductive pad such as a bonding pad of the display panel 110 using the chip-on-glass (COG) technique or the chip-on-panel (COP) technique, or implemented in the display panel 110 using the chip-on-film (COF) technique. In one or more example embodiments, the gate driving circuit 130 may be formed in the bezel area BA of the display panel 110 using a gate-in-panel (GIP) technique.

When a specific gate line is selected and driven by the gate driving circuit 130, the data driving circuit 120 can convert image data Data received from the controller 140 into data voltages in an analog form and supply the data voltages resulting from the converting to a plurality of data lines DL.

The data driving circuit 120 may be located in, and/or electrically connected to, but not limited to, only one side or portion (e.g., an upper edge or a lower edge) of the display panel 110. In one or more example embodiments, the data driving circuit 120 may be located in, and/or electrically connected to, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The gate driving circuit 130 may be located in, and/or electrically connected to, but not limited to, only one side or portion (e.g., a left edge or a right edge) of the display panel 110. In one or more example embodiments, the gate driving circuit 130 may be located in, and/or electrically connected to, but not limited to, two sides or portions (e.g., a left edge and a right edge) of the panel 110 or at least two of four sides or portions (e.g., an upper edge, a lower edge, the left edge, and the right edge) of the panel 110 according to driving schemes, panel design schemes, or the like.

The controller 140 may be a timing controller 140 used in the typical display technology or a control apparatus/device capable of additionally performing other control functionalities in addition to the typical function of the timing controller. In one or more example embodiments, the controller 140 may be one or more other control circuits different from the timing controller 140, or a circuit or component in the control apparatus/device The controller 140 may be implemented using various circuits or electronic components such as an integrated circuit (IC), a field programmable gate array (FPGA), an application specific integrated circuit (ASIC), a processor, and/or the like.

The controller 140 may be mounted on a printed circuit board, a flexible printed circuit, or the like, and may be electrically connected to the data driving circuit 120 and the gate driving circuit 130 through the printed circuit board, the flexible printed circuit, or the like. The controller 140 can transmit signals to, and receive signals from, the data driving circuit 120 via one or more predetermined interfaces. For example, such interfaces may include a low voltage differential signaling (LVDS) interface, an embedded clock point-point interface (EPI), a serial peripheral interface (SPI), and the like. The controller 140 may include a storage medium or one or more storage locations such as one or more registers.

In one or more aspects, the display device 100 may be a self-emissive display such as an organic light emitting diode (OLED) display, a quantum dot (QD) display, a micro light emitting diode (M-LED) display, and the like with, or without, a backlight unit.

Figure 2:
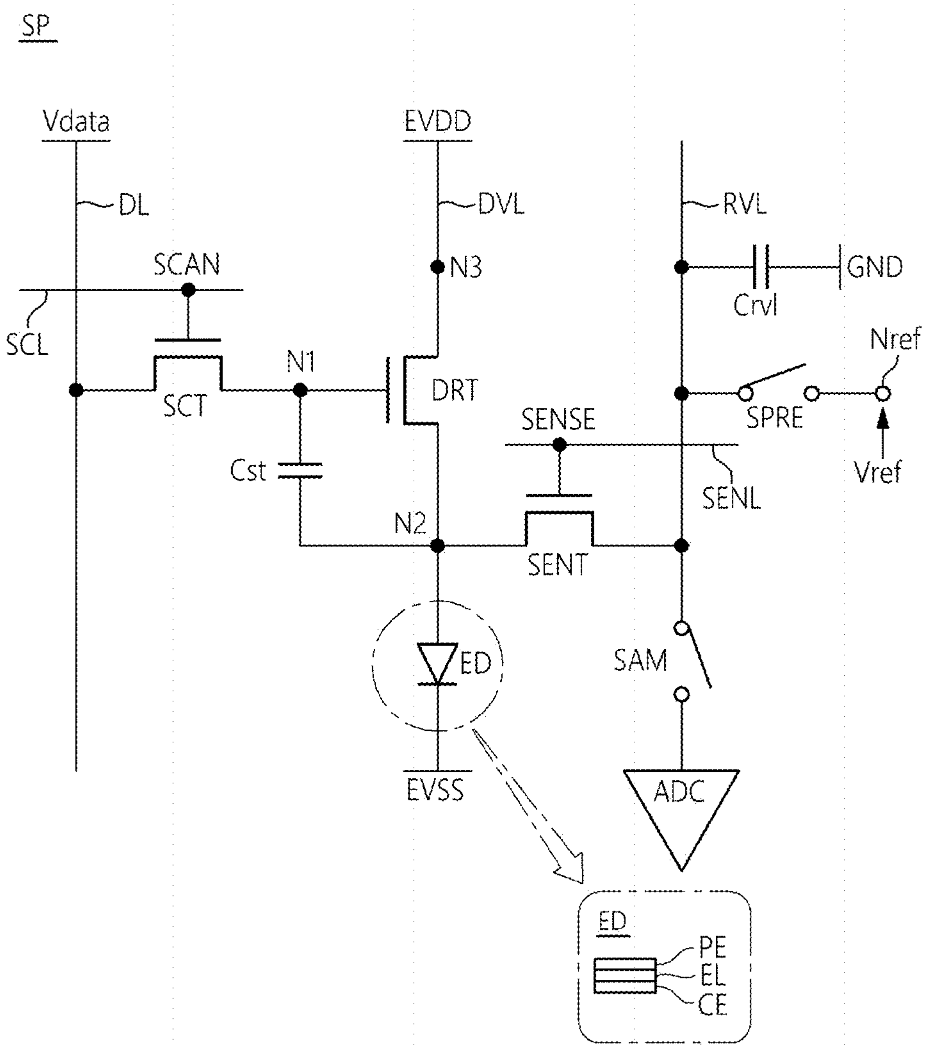
FIG. 2 illustrates an example equivalent circuit of a subpixel included in the display device according to aspects of the present disclosure.

FIG. 2 illustrates an example equivalent circuit of a subpixel SP included in the display device 100 according to aspects of the present disclosure.

Referring to FIG. 2, the display panel 110 may include a plurality of subpixels SP disposed on a substrate SUB. The display panel 110 may include a silicon material or a glass substrate.

Referring to FIG. 2, in one or more example embodiments, each of the plurality of subpixels SP disposed in the display panel 110 of the display device 100 may include a light emitting element ED, a driving transistor DRT, a scan transistor SCT, a sensing transistor SENT, a storage capacitor Cst, and the like. Such a circuit structure in which one subpixel SP is configured with three transistors (3T: DRT, SCT and SENT) and one capacitor (1C: Cst) may be referred to as a "3T1C structure".

The light emitting element ED may include a pixel electrode PE, a common electrode CE, and an emission layer EL disposed between the pixel electrode PE and the common electrode CE. For example, the pixel electrode PE may be disposed in each subpixel SP, and the common electrode CE may be commonly disposed in all, or two or more, of the plurality of subpixels SP. For example, the pixel electrode PE may be an anode electrode, and the common electrode CE may be a cathode electrode. In another example, the pixel electrode PE may be a cathode electrode, and the common electrode CE may be an anode electrode. In one or more example embodiments, the light emitting element ED may be an organic light emitting diode (OLED), a light emitting element configured with quantum dots, a micro light emitting diode (μ-LED), a light emitting diode (LED) based on inorganic material, or the like.

In an example where the light emitting element ED is an organic light emitting diode (OLED), the display panel 110 may be an OLED-on-silicon (OLEDoS) panel.

The driving transistor DRT may be a transistor for driving the light emitting element ED, and may include a first node N1, a second node N2, a third node N3, and the like.

The first node N1 of the driving transistor DRT may be the gate node of the driving transistor DRT, and may be electrically connected to the source or drain node of the scan transistor SCT. The second node N2 of the driving transistor DRT may be the source or drain node of the driving transistor DRT. The second node N2 may be electrically connected to the source or drain node of the sensing transistor SENT, and also connected to the pixel electrode PE of the light emitting element ED. The third node N3 of the driving transistor DRT may be electrically connected to a driving voltage line DVL for carrying a driving voltage EVDD.

The scan transistor SCT can be controlled by a scan signal SCAN, and may be connected between the first node N1 of the driving transistor DRT and a data line DL. The scan transistor SCT can be turned on or turned off by a scan signal SCAN carried through a scan signal line SCL, which is a type of the gate line GL, and control an electrical connection between the data line DL and the first node N1 of the driving transistor DRT.

The scan transistor SCT can be turned on by a scan signal SCAN having a turn-on level voltage, and pass a data voltage Vdata carried through the data line DL to the first node of the driving transistor DRT.

The turn-on level voltage of the scan signal SCAN for turning on the scan transistor SCT may be a high level voltage or a low level voltage. A turn-off level voltage of the scan signal SCAN for turning off the scan transistor SCT may be a low level voltage or a high level voltage. In an example where the scan transistor SCT is an n-type transistor, the turn-on level voltage may be a high level voltage, and the turn-off level voltage may be a low level voltage. In another example where the scan transistor SCT is an p-type transistor, the turn-on level voltage may be a low level voltage, and the turn-off level voltage may be a high level voltage.

The sensing transistor SENT can be controlled by a sense signal SENSE and may be connected between the second node N2 of the driving transistor DRT and a reference voltage line RVL. The sensing transistor SENT can be turned on or turned off by the sense signal SENSE carried through a sense signal line SENL, which is another type of the gate line GL, and control an electrical connection between the second node N2 of the driving transistor DRT and the reference voltage line RVL.

The sensing transistor SENT can be turned on by the sense signal SENSE having a turn-on level voltage, and pass a reference voltage Vref carried through the reference voltage line RVL to the second node N2 of the driving transistor DRT.

The turn-on level voltage of the sense signal SENSE for turning on the sensing transistor SENT may be a high level voltage or a low level voltage. A turn-off level voltage of the sense signal SENSE for turning off the sensing transistor SENT may be a low level voltage or a high level voltage. In an example where the sensing transistor SENT is an n-type transistor, the turn-on level voltage may be a high level voltage, and the turn-off level voltage may be a low level voltage. In another example where the sensing transistor SENT is an p-type transistor, the turn-on level voltage may be a low level voltage, and the turn-off level voltage may be a high level voltage.

In one or more example embodiments, the display device 100 may further include a line capacitor Crvl formed between the reference voltage line RVL and the ground GND, a sampling switch SAM for controlling a connection between the reference voltage line RVL and an analog-to-digital converter ADC, and a power switch SPRE for controlling a connection between the reference voltage line RVL and a reference voltage supply node Nref. The reference voltage Vref output from a power supply may be supplied to the reference voltage supply node Nref, and then, applied to the reference voltage line RVL through the power switch SPRE.

Further, the sensing transistor SENT can be turned on by a sense signal SENSE having the turn-on level voltage, and thereby, pass a voltage at the second node N2 of the driving transistor DRT to the reference voltage line RVL. Thereby, charging of the line capacitor Crvl formed between the reference voltage line RVL and the ground GND can be performed.

For example, the function of the sensing transistor SENT passing the voltage of the second node N2 of the driving transistor DRT to the reference voltage line RVL may be used when a corresponding subpixel SP is driven to sense one or more characteristic values of the subpixel SP. In this example, the voltage passed to the reference voltage line RVL may be a voltage to determine a characteristic value of the subpixel SP or a voltage where the characteristic value of the subpixel SP is contained.

Herein, the characteristic value of the subpixel SP may be a characteristic value of the driving transistor DRT or the light emitting element ED. The characteristic value of the driving transistor DRT may include a threshold voltage and/or mobility of the driving transistor DRT. The characteristic value of the light emitting element ED may include a threshold voltage of the light emitting element ED.

Each of the driving transistor DRT, the scan transistor SCT, and the sensing transistor SENT may be an n-type transistor, or a p-type transistor. Herein, for convenience of description, discussions are provided based on an example where each of the driving transistor DRT, the scan transistor SCT, and the sensing transistor SENT is an n-type transistor.

The storage capacitor Cst may be connected between the first node N1 and the second node N2 of the driving transistor DRT. The storage capacitor Cst can store the amount of electric charge corresponding to a voltage difference between both terminals and maintain the voltage difference between both terminals for a predetermined frame time. As a result, the corresponding subpixel SP can emit light for the predetermined frame time.

The storage capacitor Cst may be an external capacitor intentionally designed to be located outside of the driving transistor DRT, other than an internal capacitor, such as a parasitic capacitor (e.g., a Cgs or a Cgd), that may be formed between the gate node and the source node (or the drain node) of the driving transistor DRT.

In an embodiment, the scan signal line SCL and the sense signal line SENL may be different gate lines GL. In this embodiment, a scan signal SCAN carried through the scan signal line SCL and a sense signal SENSE carried through the sense signal line SENL may be separate gate signals, and respective turn-on and/or turn-off timings of the scan transistor SCT and the sensing transistor SENT in one subpixel SP may be independent of each other. For example, turn-on and/or turn-off timings of the scan transistor SCT and turn-on and/or turn-off timings of the sensing transistor SENT in one subpixel SP may be the same as, or different from, each other according to design requirements.

In another embodiment, the scan signal line SCL and the sensing signal line SENL may be the same gate line GL. For example, the gate node of the scan transistor SCT and the gate node of the sensing transistor SENT in one subpixel SP may be connected to one gate line GL. In this embodiment, a scan signal SCAN carried through the scan signal line SCL and a sense signal SENSE carried through the sense signal line SENL may be the same gate signal, and respective turn-on and/or turn-off timings of the scan transistor SCT and the sensing transistor SENT in one subpixel SP may be the same.

In an embodiment, the reference voltage line RVL may be disposed in each column of subpixels SP. In another embodiment, the reference voltage line RVL may be disposed in every two or more columns of subpixels SP. In the embodiment where the reference voltage line RVL is disposed in every two or more columns of subpixels SP, a plurality of subpixels SP may receive a reference voltage Vref through one reference voltage line RVL.

Each of driving transistors DRT included in a plurality of subpixels SP disposed in the display panel 110 of the display device 100 may have one or more unique characteristic values. For example, the characteristic values of the driving transistor DRT may include a threshold voltage, mobility, and the like.

The characteristic values of each driving transistor DRT included in each of a plurality of subpixels SP may vary as driving time passes. Respective driving times of subpixels SP may be different from each other. For example, driving times of some of a plurality of subpixels SP may be different from driving times of one or more other subpixels SP or the other subpixels SP. Accordingly, the characteristic values of corresponding one or more driving transistors DRT of one or more subpixels SP among a plurality of subpixels SP may be different from the characteristic values of corresponding one or more driving transistors DRT of one or more other subpixels SP.

A difference in luminance between the plurality of subpixels SP disposed on the display panel 110 may occur due to a difference in characteristic values between a plurality of driving transistors DRT disposed in the display panel 110. Accordingly, luminance unevenness of the display panel 110 may occur.

To address this issue, in one or more example embodiments, the display device 100 may provide a compensation function of performing sensing driving for subpixels SP of the display panel 110, detecting respective characteristic values of driving transistors DRT, and performing operation for reducing a difference in characteristic values between the driving transistors DRT.

Figure 3:
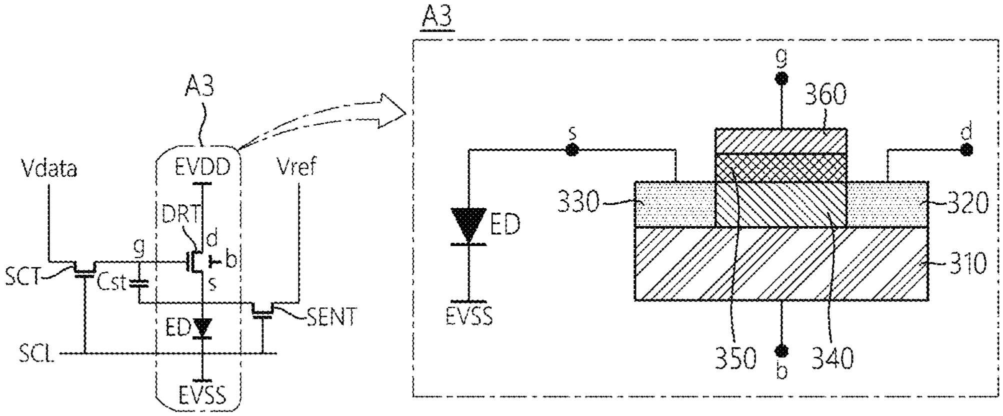
FIG. 3 illustrates an example equivalent circuit of a subpixel and an example structure of a driving transistor included in the subpixel in the display device according to aspects of the present disclosure.
Figure 4:
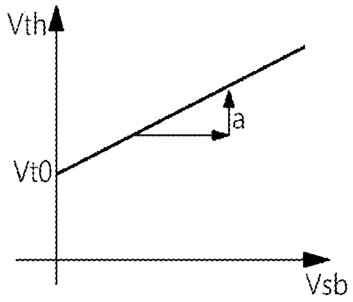
FIG. 4 is an example graph illustrating a threshold voltage varying depending on a body voltage in the display device according to aspects of the present disclosure.

FIG. 3 illustrates an example equivalent circuit of a subpixel SP and an example structure of a driving transistor DRT included in the subpixel SP in the display device 100 according to aspects of the present disclosure. FIG. 4 is an example graph illustrating a threshold voltage varying depending on a body voltage in the display device 100 according to aspects of the present disclosure.

Referring to FIG. 3, in one or more example embodiments, a subpixels SP disposed in the display panel 110 of the display device 100 may include a light emitting element ED, a driving transistor DRT, a scan transistor SCT, a sensing transistor SENT, a storage capacitor Cst, and the like. The subpixel SP shown in FIG. 3 may be basically equal to the subpixel SP shown in FIG. 2. However, the scan transistor SCT and sensing transistor SENT of FIG. 2 may be controlled by different signals from each other, which may be referred to as two-scan driving. In contrast, the scan transistor SCT and sensing transistor SENT of FIG. 3 may be controlled by the same signal, which may be referred to as one-scan driving. For example, as shown in FIG. 3, the gate node of the scan transistor SCT and the gate node of the sensing transistor SENT may be electrically connected to a scan signal line SCL.

FIG. 3 shows a cross-sectional view of the corresponding driving transistor DRT disposed in a partial area A3 of the subpixel SP.

The driving transistor DRT may include a body 310, a drain layer 320, a source layer 330, an active layer 340, a gate insulating layer 350, and a gate layer 360.

The drain layer 320, the source layer 330, and active layer 340 may be disposed on the body 310.

The active layer 340 may be disposed between the drain layer 320 and the source layer 330.

The gate insulating layer 350 may be disposed on the active layer 340.

The gate layer 360 may be disposed on the gate insulating layer 350.

The source layer 330 may be a source node, which may be the third node N3 shown in FIG. 2.

The drain layer 320 may be a drain node, which may be the second node N2 shown in FIG. 2.

A driving voltage EVDD may be supplied to the drain layer 320.

A data voltage Vdata may be supplied to the gate layer 360.

A reference voltage Vref may be supplied to the source layer 330.

A driving current can flow from the drain layer 320 to the source layer 330 by a voltage charged in the storage capacitor Cst. Thus, the driving current can flow along the active layer 340.

The driving transistor DRT can have one or more unique characteristics. The unique characteristics of the driving transistor DRT may include a threshold voltage Vth. The threshold voltage Vth of the driving transistor DRT may have an initial threshold voltage value Vt0. The threshold voltage Vth of the driving transistor DRT may have a value varied based on external factors.

In addition, a body voltage may be supplied to the body 310. As such a body voltage is supplied to the body 310, a body effect may occur. The body effect may mean a phenomenon in which the threshold voltage of a transistor varies as the body voltage is supplied to the body of the transistor.

FIG. 4 illustrates a graph showing how a threshold voltage varies depending on variance of a body voltage.

The threshold voltage Vth may be expressed by the following equation: "threshold voltage (Vth)=initial threshold voltage (Vt0)+body effect coefficient (a)*source body voltage (Vsb)." The source body voltage Vsb may be a voltage value obtained by subtracting a voltage of the body 310 from a voltage of the source layer 330. The body effect coefficient (a) may be a coefficient obtained through experiment.

When the source body voltage Vsb is small, a corresponding threshold voltage Vth may be the initial threshold voltage Vt0. However, as the source body voltage Vsb increases, a corresponding threshold voltage Vth may increase.

When the threshold voltage Vth increases, image quality may become poor depending on such an increased threshold voltage Vth. Therefore, in order to compensate for an increased threshold voltage Vth, the display device 100 may be unnecessarily required to increase a corresponding data voltage Vdata.

In particular, when the display panel 110 is an OLEDOS panel, the display device 100 may be required to supply a body voltage to the body 310 to ensure stable driving of a corresponding driving transistor DRT. That is, in an example where an OLEDOS panel as the display panel 110 is used in the display device 100, a variance in a threshold voltage caused by the body effect may be problematic for stable driving of the corresponding driving transistor DRT.

In addition, in the example where the OLEDOS panel is used, each subpixel included in the display device 100 may be required to have a size as small as a micro level in order to implement ultra-high resolution. In order to reduce the size of a subpixel, it is desirable to minimize elements included in the subpixel.

To address these issues, aspects of the present disclosure may provide the display device 100 capable of stably controlling threshold voltages of driving transistors and a driving method of the display device 100.

Aspects of the present disclosure may provide the display device 100 capable of enabling circuits disposed in the display panel 110 to be configured with improved integration, and a driving method of the display device 100.

Aspects of the present disclosure may provide the display device 100 capable of being driven with low power consumption by enabling circuits disposed in the display panel 110 to be configured with improved integration, and a driving method of the display device 100.

Figure 5:
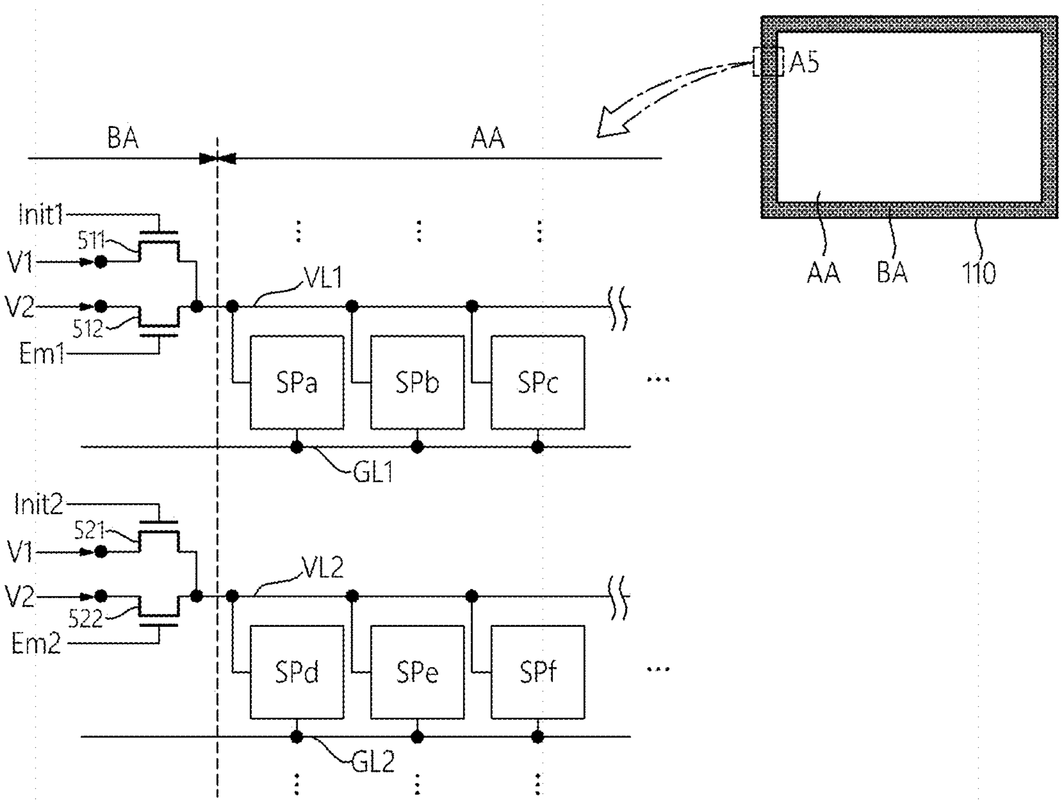
FIGS. 5 and 6 illustrate example configurations of a display panel including at least one initialization transistor and at least one emission transistor in the display device according to aspects of the present disclosure.
Figure 6:
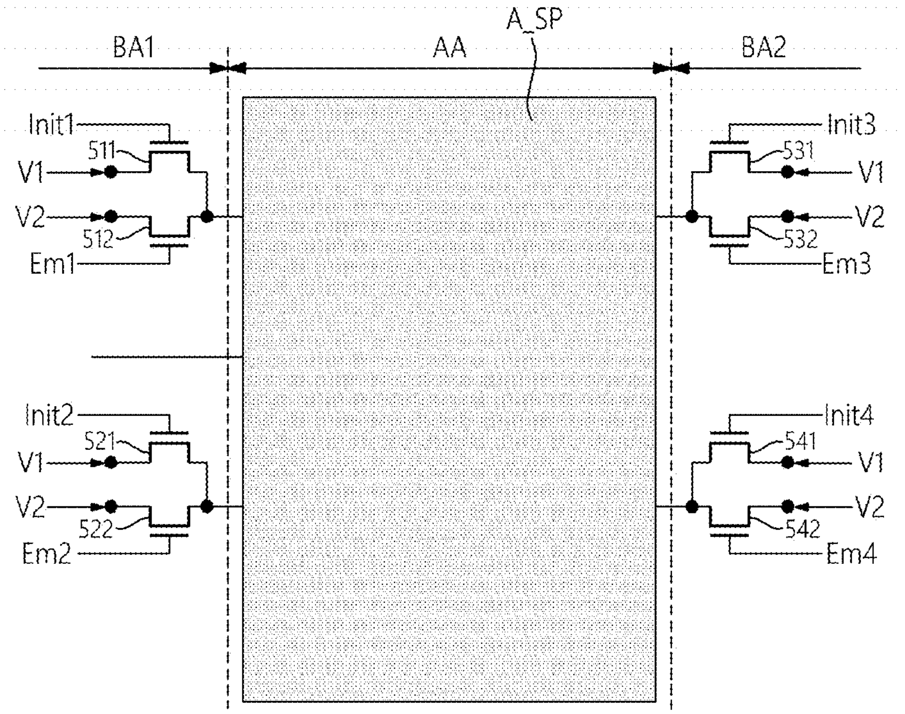

FIGS. 5 and 6 illustrate example configurations of the display panel 110 including at least one initialization transistor and at least one emission transistor in the display device 100 according to aspects of the present disclosure.

Referring to FIG. 5, the display panel 110 may include a display area AA and a bezel area BA.

The display area AA may be an area allowing an image to be displayed, and the bezel area BA may be an area where an image is not displayed.

A plurality of subpixels SP may be disposed in the display area AA.

At least one driving circuit, at least one voltage line, at least one signal line, and the like for driving the plurality of subpixels SP may be disposed in the bezel area BA.

FIG. 5 illustrates a partial area A5 of the display panel 110. The area A5 of the display panel 110 may include a portion of the display area AA and a portion of the bezel area BA. FIG. 5 illustrates six subpixels SP disposed in the display area AA.

A plurality of initialization transistors (e.g., first and second initialization transistors 511 and 521) and a plurality of emission transistors (e.g., first and second emission transistors 512 and 522) may be disposed in the bezel area BA.

Voltage lines for electrically connecting a plurality of initialization transistors to subpixels SP may be disposed in the bezel area BA and the display area AA.

Voltage lines for electrically connecting a plurality of emission transistors to subpixels SP may be disposed in the bezel area BA and the display area AA.

A plurality of gate lines GL may be disposed in the bezel area BA and the display area AA.

A first gate line GL1 may be electrically connected to a first subpixel SPa, a second subpixel SPb, and a third subpixel SPc. The subpixels SP connected to the first gate line GL1 may be referred to as a first column subpixel group.

A first voltage line VL1 may be electrically connected to the first subpixel SPa, the second subpixel SPb, and the third subpixel SPc.

The first voltage line VL1 may be electrically connected to a first initialization transistor 511 and a first emission transistor 512.

The first initialization transistor 511 may be supplied with a first initialization signal Init1 through the gate node thereof. The first initialization transistor 511 may be controlled by the first initialization signal Init1. The first initialization transistor 511 may be supplied with a first voltage V1.

The first emission transistor 512 may be supplied with a first emission signal Em1 through the gate node thereof. The first emission transistor 512 may be controlled by the first emission signal Em1. The first emission transistor 512 may be supplied with a second voltage V2.

The first subpixel SPa, the second subpixel SPb, and the third subpixel SPc may be supplied with the first voltage V1 or the second voltage V2 by the control of the first initialization signal Init1 and the first emission signal Em1. Since the subpixels SP can be supplied with the first voltage V1 or the second voltage V2, the threshold voltages of driving transistors DRT included in the subpixels SP can be stably controlled.

Figure 7:
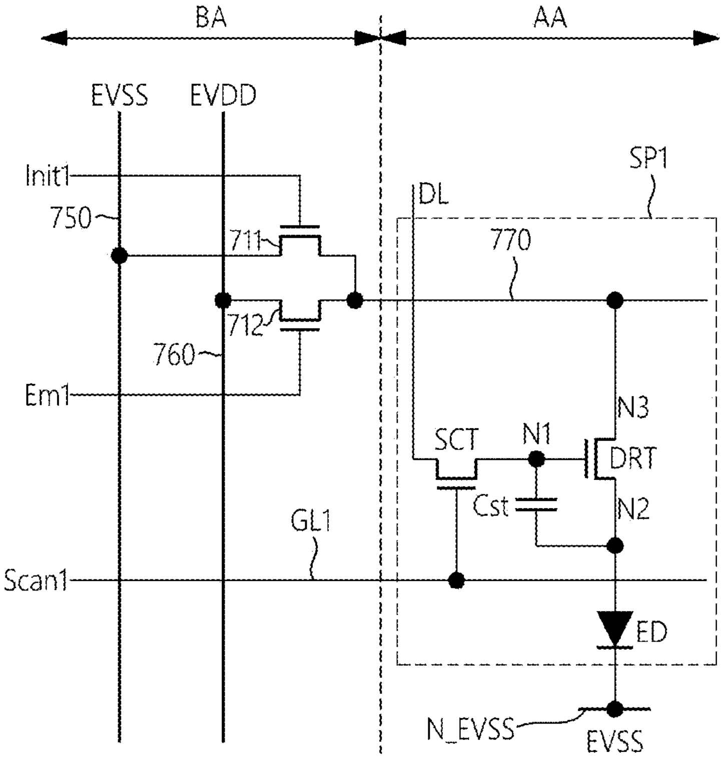
FIG. 7 illustrates an example configuration of the display panel including an initialization transistor and an emission transistor in Embodiment 1 in the display device according to aspects of the present disclosure.

A second gate line GL2 may be electrically connected to a fourth subpixel SPd, a fifth subpixel SPe, and a sixth subpixel SPf. The subpixels SP connected to the second gate line GL2 may be referred to as a second column subpixel group. In the description of FIG. 7 and below, a description of the first row subpixel group, the second row subpixel group, and the third row subpixel group are mentioned. In the description of the corresponding part, it may be expressed as "the first column subpixel group includes the first subpixel SP1." Additionally, it may be expressed as "the second column subpixel group includes the second subpixel SP2, and the third column subpixel group includes the third subpixel SP3."

A second voltage line VL2 may be electrically connected to the fourth subpixel SPd, the fifth subpixel SPe, and the sixth subpixel SPf.

The second voltage line VL2 may be electrically connected a second initialization transistor 521 and a second emission transistor 522.

The second initialization transistor 521 may be supplied with a second initialization signal Init2 from the gate node thereof. The second initialization transistor 521 may be controlled by the second initialization signal Init2. The second initialization transistor 521 may be supplied with the first voltage V1.

The second emission transistor 522 may be supplied with a second emission signal Em2 through the gate node thereof. The second emission transistor 522 may be controlled by the second emission signal Em2. The second emission transistor 522 may be supplied with the second voltage V2.

The fourth subpixel SPd, the fifth subpixel SPe, and the sixth subpixel SPf may be supplied with the first voltage V1 or the second voltage V2 by the control of the second initialization signal Init2 and the second emission signal Em2. Since the subpixels SP can be supplied with the first voltage V1 or the second voltage V2, the threshold voltages of driving transistors DRT included in the subpixels SP can be stably controlled.

After the first initialization transistor 511 and the first emission transistor 512 are controlled during a first period, the second initialization transistor 521 and the second emission transistor 522 may be controlled during a second period.

The first column subpixel group may be controlled during the first period, and the second column subpixel group may be controlled during the second period.

During the first period, driving transistors included in the first column subpixel group can be stably controlled, and during the first period, storage capacitors included in the first column subpixel group can be charged with corresponding voltages for emission.

During the second period, driving transistors included in the second column subpixel group can be stably controlled, and during the second period, storage capacitors included in the second column subpixel group can be charged with voltages for emission.

A structure where one subpixel includes one light emitting element and three transistors may be referred to as a "3T1C structure." A structure where one subpixel includes one light emitting element and two transistors may be referred to as a "2T1C structure." Each of the plurality of subpixels SP shown in FIG. 5 may include a driving transistor, a scan transistor, a storage capacitor, a light emitting element, and the like. Thus, each subpixel SP shown in FIG. 5 may have a "2T1C structure" or a "3T1C structure."

Referring to FIG. 5, the initialization transistors and the emission transistors may be disposed in a portion of the bezel area BA adjacent to any one of upper, lower, left, and right edges of the display area AA. For example, the initialization transistors and the emission transistors may be disposed in one portion of the bezel area BA.

In another example, the initialization transistors and the emission transistors may be disposed in two or more portions of the bezel area BA. Referring to FIG. 6, the display panel 110 may include the display area AA, a first bezel area BA1, and a second bezel area BA2. The first bezel area BA1 and the second bezel area BA2 may be located on or in two sides of the display area AA.

Referring to FIGS. 5 and 6, the first initialization transistor 511, the first emission transistor 512, the second initialization transistor 521, and the second emission transistor 522 may be disposed in the first bezel area BA1.

Referring to FIG. 6, a third initialization transistor 531, a third emission transistor 532, a fourth initialization transistor 541, and a fourth emission transistor 542 may be disposed in the second bezel area BA2.

FIG. 7 illustrates an example configuration of the display panel 110 including an initialization transistor and an emission transistor in Embodiment 1 in the display device 100 according to aspects of the present disclosure.

FIG. 7 illustrates that a first subpixel SP1 may be supplied with a driving voltage EVDD or a base voltage EVSS by the control of a first initialization signal Init1 and a first emission signal Em1. During an initialization period T_Init, the first subpixel SP1 may be supplied with the base voltage EVSS, and during an emission period T_Em, the first subpixel SP1 may be supplied with the driving voltage EVDD. As the result of this operation, the threshold voltage of a driving transistor DRT included in the first subpixel SP1 can be stably controlled. The first subpixel SP1 shown in FIG. 7 may be the same as the first subpixel SPa shown in FIG. 5.

A plurality of subpixels SP may be disposed in the display area AA, and driving circuits, voltage lines, signal lines, and the like for driving the subpixels SP may be disposed in the bezel area BA.

FIG. 7 illustrates one subpixel SP disposed in the display area AA. FIG. 7 illustrates an initialization transistor 711, an emission transistor 712, a main base voltage line 750, and a main driving voltage line 760, which are disposed in the bezel area BA.

Referring to FIG. 7, in one or more example embodiments, the subpixel SP may include a light emitting element ED, a driving transistor DRT, a scan transistor SCT, a storage capacitor Cst, and the like.

The driving transistor DRT may be a transistor for driving the light emitting element ED. The driving transistor DRT may be electrically connected between a second node N2 and a third node N3. The gate node of the driving transistor DRT may be electrically connected to, or correspond to, a first node N1.

The scan transistor SCT may be electrically connected between a data line DL and the first node N1. The gate node of the scan transistor SCT may be electrically connected to a first gate line GL1. A corresponding data voltage Vdata may be supplied to the gate node of the driving transistor DRT by the control of the scan transistor SCT.

The storage capacitor Cst may be electrically connected between the first node N1 and the second node N2. The storage capacitor Cst may be charged with a certain level of voltage, and the subpixel SP can emit light with an intended luminance based on the voltage stored in the storage capacitor Cst.

The light emitting element ED may be electrically connected between the second node N2 and a base voltage node N_EVSS. The base voltage node (N_EVSS) may be a node to which a base voltage EVSS is supplied. As the light emitting element ED is driven, an image may be displayed on the display panel 110.

The first initialization transistor 711 may be electrically connected between the main base voltage line 750 and an auxiliary driving voltage line 770. The first initialization transistor 711 may be controlled by the first initialization signal Init1. The main base voltage line 750 may be located in the bezel area BA. The main base voltage line 750 may be a line for supplying the base voltage EVSS to the subpixel SP.

The first emission transistor 712 may be electrically connected between the main driving voltage line 760 and the auxiliary driving voltage line 770. The first emission transistor 712 may be controlled by the first emission signal Em1. The main driving voltage line 760 may be disposed in the bezel area BA. The main driving voltage line 760 may be a line for supplying a driving voltage EVDD to the subpixel SP.

The subpixel SP shown in FIG. 7 may be driven by driving timings shown in FIGS. 8 to 15. Hereinafter, the driving of the subpixel SP shown in FIG. 7 will be described with reference to FIGS. 8 to 15.

FIGS. 8 to 15 illustrate example driving timings of the initialization transistor and the emission transistor in Embodiment 1 shown in FIG. 7 in the display panel 110 according to aspects of the present disclosure.

A period during which the subpixel SP is driven may include an initialization period and an emission period.

Figure 8:
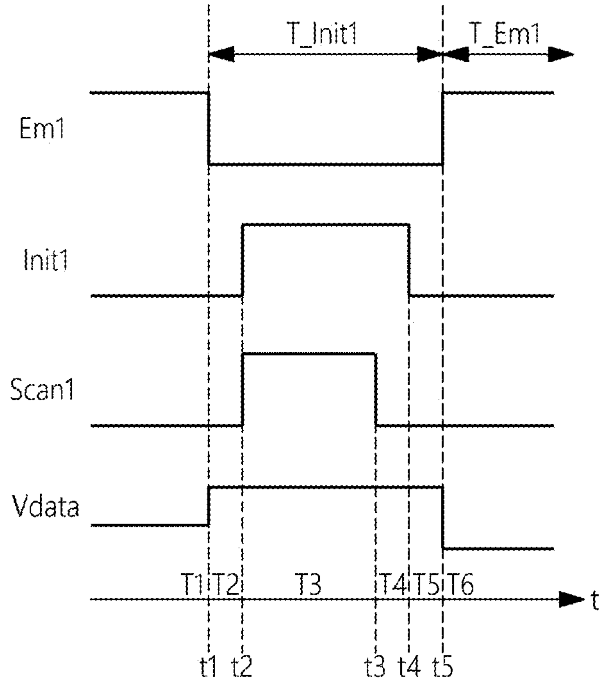
FIGS. 8 to 15 illustrate example driving timings of the initialization transistor and the emission transistor in Embodiment 1 in the display panel according to aspects of the present disclosure.

Referring to FIG. 8, the period during which the subpixel SP is driven may include a first initialization period T_Init1 and a first emission period T_Em1.

The first initialization period T_Init1 may be a period for preparation for enabling the subpixel SP to emit light.

The first emission period T_Em1 may be a period during which the subpixel SP emits light.

A period during which the subpixel SP is driven may include a first period T1, a second period T2, a third period T3, a fourth period T4, a fifth period T5, and a sixth period T6. An n-th period Tn may be a period from an (n−1)-th time to an n-th time. Here, n is a natural number of 1 or more. For example, referring to FIG. 8, the second period T2 may be a period from a first time t1 to a second time t2. The fifth period T5 may be a period from a fourth time t4 to a fifth time t5.

The first period T1 may be an emission period preceding the first initialization period T_Init1.

The second period T2 to the fifth period T5 may be included in the first initialization period T_Init1.

The sixth period T6 may be the first emission period T_Em1.

The first emission signal Em1 may have a high level during the first period T1 and the sixth period T6. The first emission signal Em1 may have a low level during the second period T2 to the fifth period T5.

The first initialization signal Init1 may have a low level during the first period T1, the second period T2, the fifth period T5, and the sixth period T6. The first initialization signal Init1 may have a high level during the third period T3 and the fourth period T4.

A first scan signal Scan1 may have a low level during the first period T1, the second period T2, the fourth period T4, the fifth period T5, and the sixth period T6. The first scan signal Scan1 may have a high level during the third period T3.

A data voltage Vdata may be supplied to the data line DL electrically connected to the first subpixel during the second period T2 to the fifth period T5.

Figure 9:
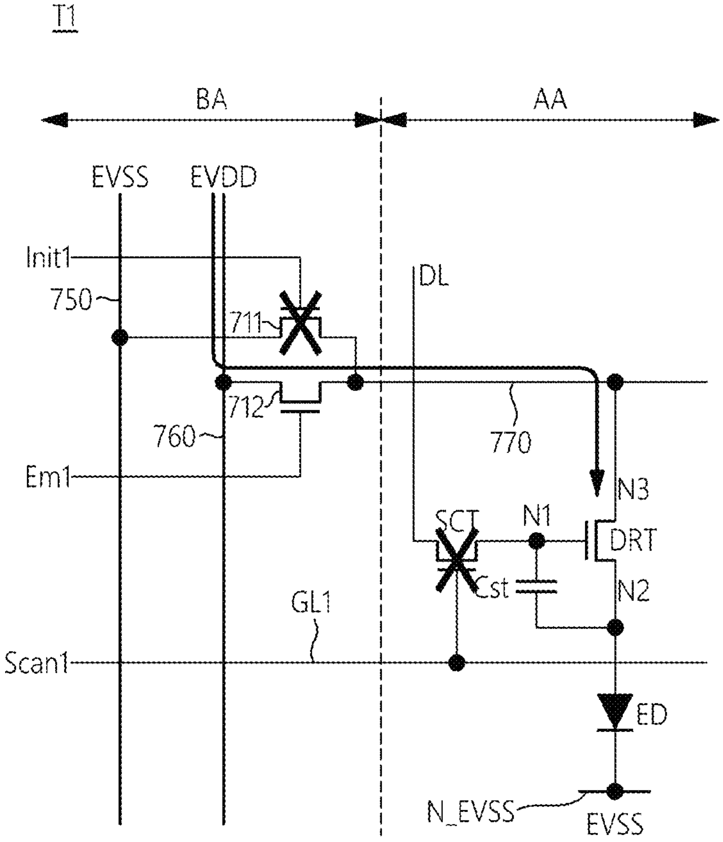

Referring to FIG. 9, the first period T1 may be an emission period preceding the first initialization period T_Init1. During the first period T1, the scan transistor SCT may be turned off, the initialization transistor 711 may be turned off, and the emission transistor 712 may be turned on. Since the emission transistor 712 is turned on, the driving voltage EVDD may be supplied to the drain node of the driving transistor DRT. Thus, during the first period T1, the emission transistor 712 can be turned on, and the driving voltage EVDD can be supplied to the driving transistor DRT.

Figure 10:
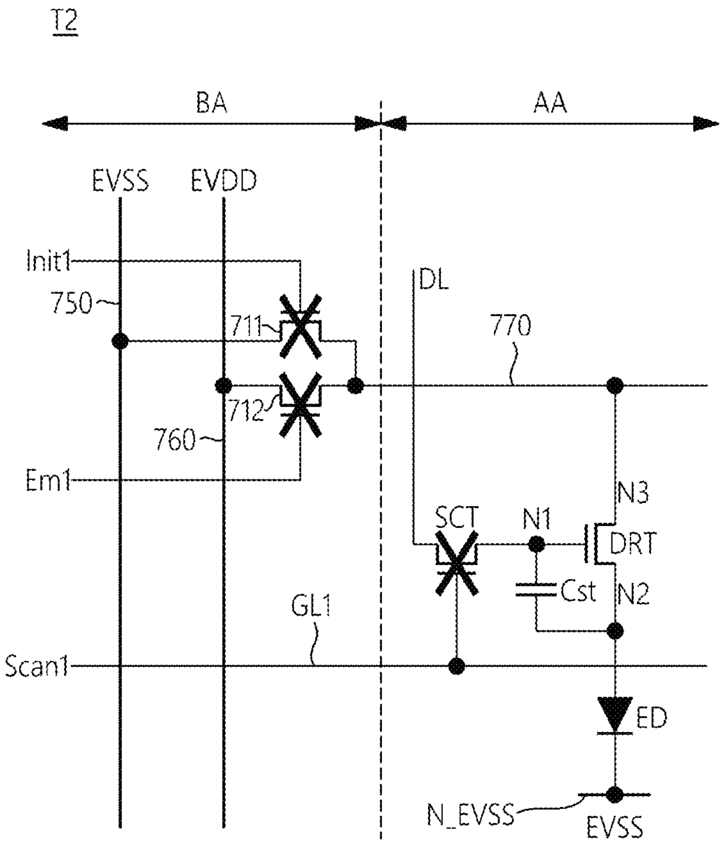

Referring to FIG. 10, the second period T2 may be a period during which the supply of the driving voltage EVDD is interrupted, and the storage capacitor Cst charged with a certain level of voltage is discharged. During the second period T2, all of the scan transistor SCT, the initialization transistor 711, and the emission transistor 712 may be turned off. Since both the initialization transistor 711 and the emission transistor 712 are turned off during the second period T2, a short circuit by the concurrent supply of the driving voltage EVDD and the base voltage EVSS can be prevented.

Figure 11:
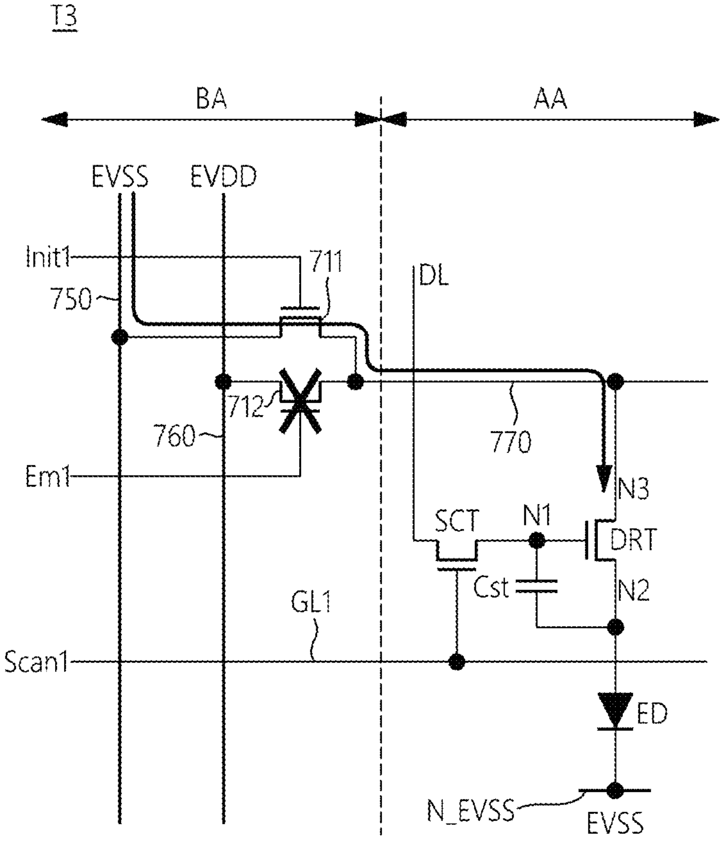

Referring to FIG. 11, the third period T3 may be a period during which the base voltage EVSS is supplied to the driving transistor DRT. During the third period T3, the scan transistor SCT and the initialization transistor 711 may be turned on. During the third period T3, the emission transistor 712 may be turned off. During the third period T3, the base voltage EVSS may be supplied to the drain node of the driving transistor DRT, and as the voltage of the drain node is lower than the voltage of the source node, the voltage of the source node may be initialized with the base voltage EVSS. During the third period T3, the source node of the driving transistor DRT may be initialized to the base voltage EVSS, and at the same time, a data voltage Vdata may be supplied to the gate node of the driving transistor DRT. As the data voltage Vdata is supplied to the gate node of the driving transistor DRT, the storage capacitor Cst may be charged with a voltage for emission.

Figure 12:
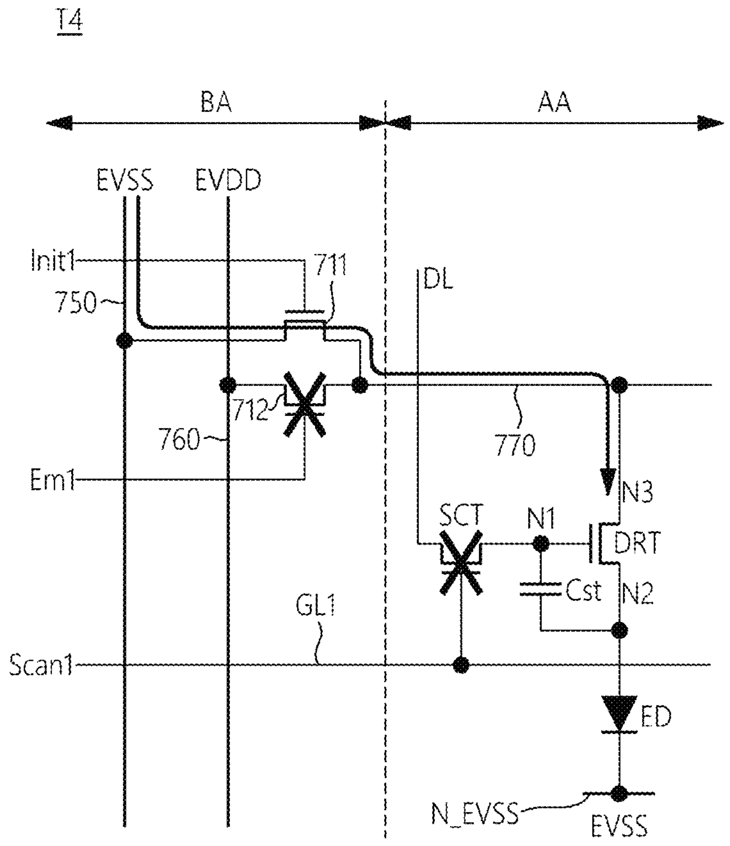

Referring to FIG. 12, the fourth period T4 may be a period for enabling the storage capacitor Cst to stably charge with a certain level of voltage. During the fourth period T4, the scan transistor SCT and the emission transistor 712 may be turned off. During the fourth period T4, the initialization transistor 711 may be turned on. The scan transistor SCT may be turned off before the initialization transistor 711 is turned off. If the scan transistor SCT is turned off after the initialization transistor 711 is turned off, the source node of the driving transistor DRT may be affected by a diode threshold voltage (Diode Vth) and a thin film transistor threshold voltage (TFT Vth). As the scan transistor SCT is turned off before the initialization transistor 711 is turned off, the voltage of the source node of the driving transistor DRT can be maintained stably.

Figure 13:
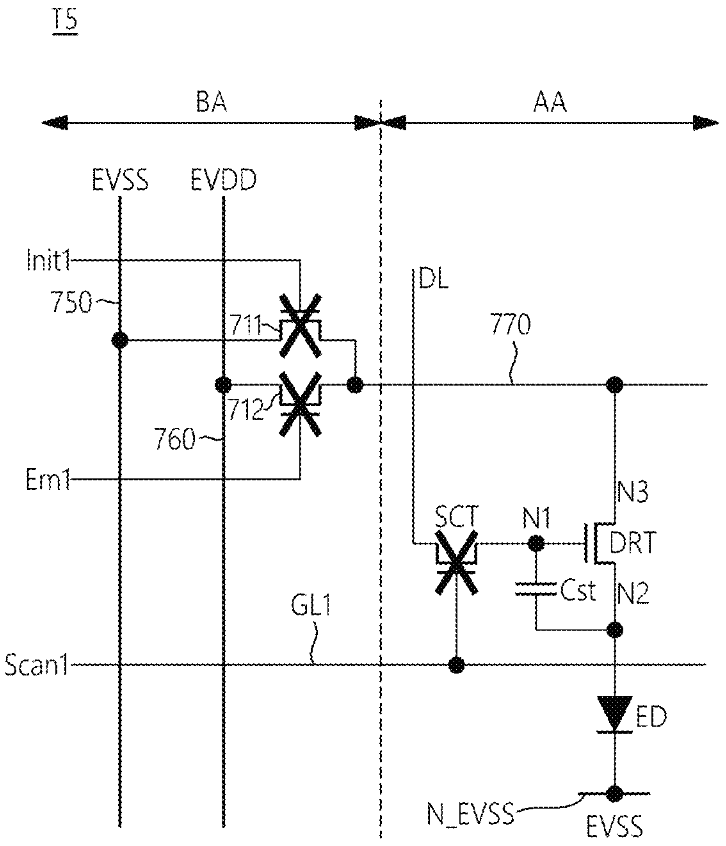

Referring to FIG. 13, the fifth period T5 may be a period during which the supply of the driving voltage EVDD is interrupted, and the storage capacitor Cst charged with a certain level of voltage is discharged. During the fifth period T5, all of the scan transistor SCT, the initialization transistor 711, and the emission transistor 712 may be turned off. Since both the initialization transistor 711 and the emission transistor 712 are turned off during the fifth period T5, a short circuit by the concurrent supply of the driving voltage EVDD and the base voltage EVSS can be prevented.

Figure 14:
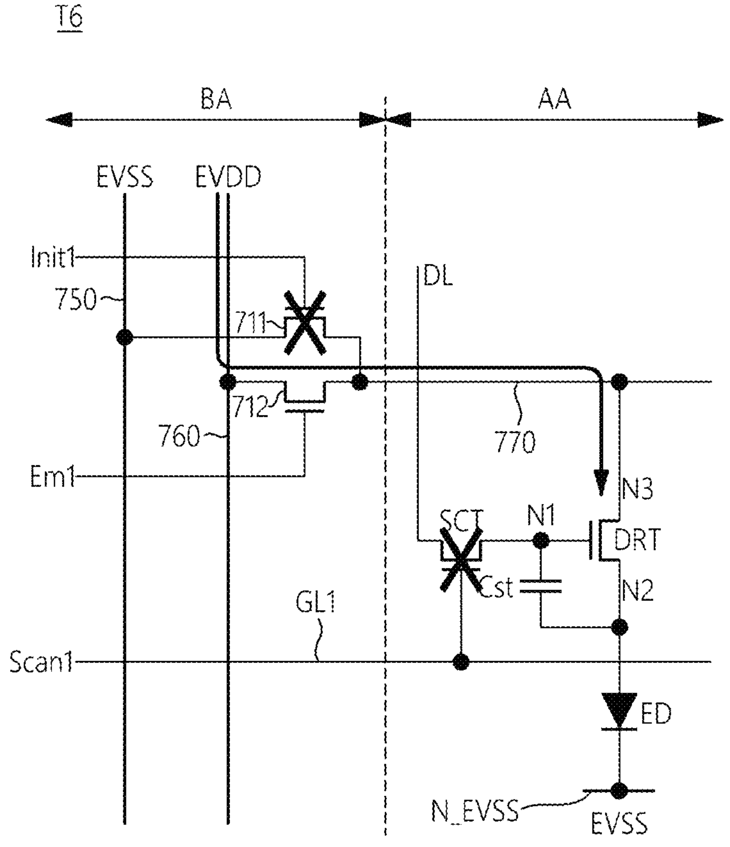

Referring to FIG. 14, the sixth period T6 may be a period during which the subpixel SP emits light. During the sixth period T6, the scan transistor SCT may be turned off, the initialization transistor 711 may be turned off, and the emission transistor 712 may be turned on. Since the emission transistor 712 is turned on, the driving voltage EVDD may be supplied to the drain node of the driving transistor DRT. Thus, during the sixth period T6, the emission transistor 712 can be turned on, and the driving voltage EVDD can be supplied to the driving transistor DRT.

As discussed above, the operation of the subpixel SP included in the first column subpixel group has been described with reference to FIGS. 8 to 14. After the operation of the first column subpixel group is controlled, the second column subpixel group may be controlled. A portion of the period during which the first column subpixel group is operated and a portion of a period during which the second column subpixel group is operated may overlay with each other.

Figure 15:
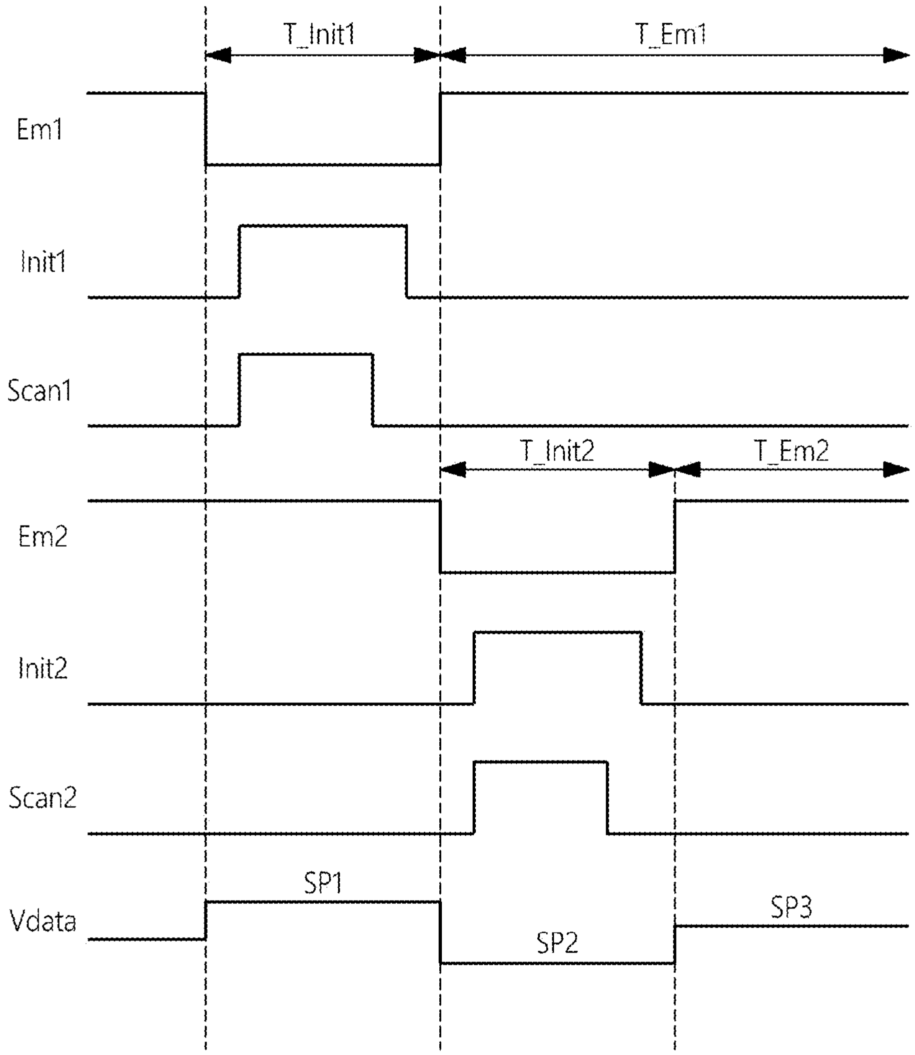

With respect to discussions on a timing diagram of FIG. 15, a first subpixel SP1 may be a subpixel included in a first column subpixel group (e.g., the first column subpixel group discussed in FIG. 5), a second subpixel SP2 may be a subpixel included in a second column subpixel group (e.g., the second column subpixel group discussed in FIG. 5), and a third subpixel SP3 may be a subpixel included in a third column subpixel group. The first subpixel SP1 may be connected to a first gate line, the second subpixel SP2 may be connected to a second gate line, and the third subpixel SP3 may be connected to a third gate line. The first subpixel SP1 shown in FIG. 15 may be the same as the first subpixel SPa shown in FIG. 5. The second subpixel SP2 shown in FIG. 15 may be the same as the second subpixel SPd shown in FIG. 5.

Referring to FIG. 15, a driving period of the first column subpixel group may include a first initialization period T_Init1 and a first emission period T_Em1. Referring to FIG. 15, a driving period of the second column subpixel group may include a second initialization period T_Init2 and a second emission period T_Em2.

During the first initialization period T_Init1, a data voltage Vdata may be a first data voltage supplied to the first subpixel SP1 included in the first column subpixel group. During the first emission period T_Em1, the first subpixel SP1 may emit light with luminance corresponding to the first data voltage. Referring to FIG. 15, when the first emission period T_Em1 is initiated, the second initialization period T_Init2 may also be initiated.

During the second initialization period T_Init2, a data voltage Vdata may be a second data voltage supplied to the second subpixel SP2 included in the second column subpixel group. During the second emission period T_Em2, the second subpixel SP2 may emit light with luminance corresponding to the second data voltage. Referring to FIG. 15, when the second emission period T_Em2 is initiated, a third initialization period may also be initiated.

During the third initialization period, a data voltage Vdata may be a third data voltage supplied to the third subpixel SP3 included in the third column subpixel group. During a third emission period, the third subpixel SP3 may emit light with luminance corresponding to the third data voltage.

Figure 16:
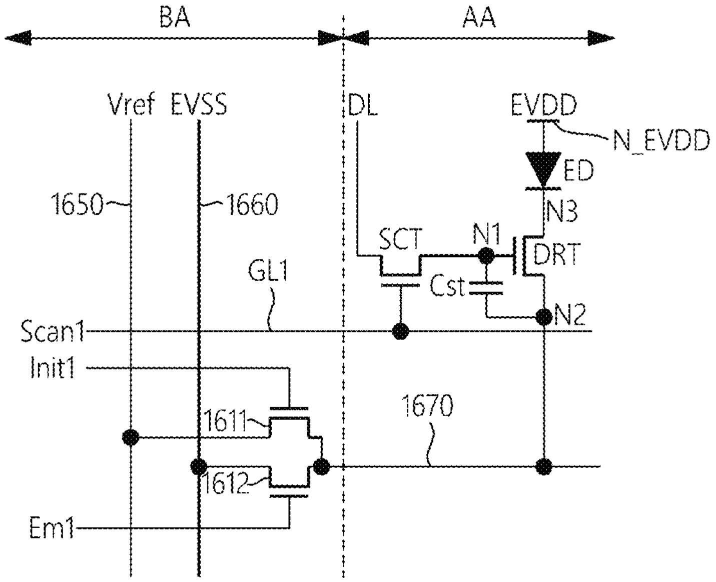
FIGS. 16 and 17 illustrate example configurations of an initialization transistor and an emission transistor in Embodiment 2 in the display panel according to aspects of the present disclosure.
Figure 17:
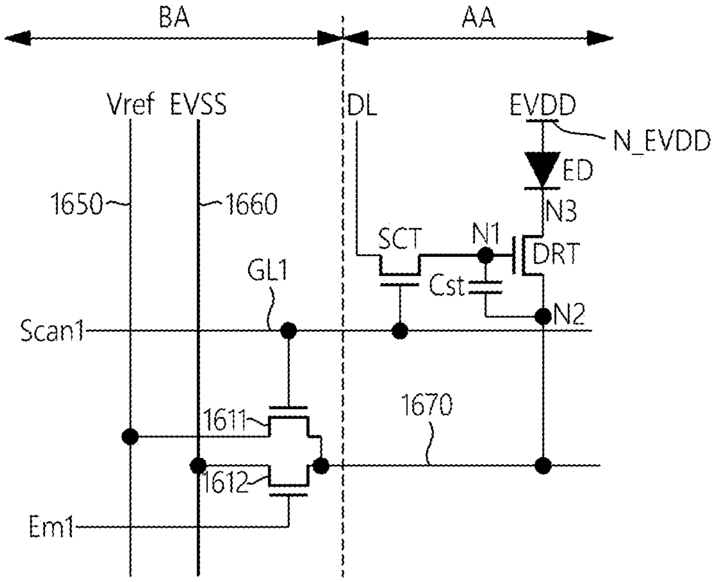

FIGS. 16 and 17 illustrate example configurations of an initialization transistor and an emission transistor in Embodiment 2 in the display panel according to aspects of the present disclosure.

FIG. 16 illustrates that a first subpixel SP1 may be supplied with a reference voltage Vref or a base voltage EVSS by the control of a first initialization signal Init1 and a first emission signal Em1. During an initialization period T_Init, the first subpixel SP1 may be supplied with the reference voltage Vref, and during an emission period T_Em, the first subpixel SP1 may be supplied with the base voltage EVSS. As the result of this operation, the threshold voltage of a driving transistor DRT included in the first subpixel SP1 can be stably controlled.

A plurality of subpixels SP may be disposed in the display area AA, and driving circuits, voltage lines, signal lines, and the like for driving the subpixels SP may be disposed in the bezel area BA.

FIG. 16 illustrates one subpixel SP disposed in the display area AA. FIG. 16 illustrates an initialization transistor, an emission transistor, a main reference voltage line 1650, and a main base voltage line 1660, which are disposed in the bezel area BA.

Referring to FIG. 16, in one or more example embodiments, the subpixel SP may include a light emitting element ED, a driving transistor DRT, a scan transistor SCT, a storage capacitor Cst, and the like.

The driving transistor DRT may be a transistor for driving the light emitting element ED. The driving transistor DRT may be electrically connected between a second node N2 and a third node N3. The gate node of the driving transistor DRT may be electrically connected to, or correspond to, a first node N1.

The scan transistor SCT may be electrically connected between a data line DL and the first node N1. The gate node of the scan transistor SCT may be electrically connected to a first gate line GL1. A data voltage Vdata may be supplied to the gate node of the driving transistor DRT by the control of the scan transistor SCT.

The storage capacitor Cst may be electrically connected between the first node N1 and the second node N2. The storage capacitor Cst may be charged with a certain level of voltage, and the subpixel SP can emit light with an intended luminance based on the voltage stored in the storage capacitor Cst.

The light emitting element ED may be electrically connected between the third node N3 and a driving voltage node N_EVDD. The driving voltage node N_EVDD may be a node to which a driving voltage EVDD is supplied. As the light emitting element ED is driven, an image may be displayed on the display panel 110.

A first initialization transistor 1611 may be electrically connected between the main reference voltage line 1650 and an auxiliary base voltage line 1670. The first initialization transistor 1611 may be controlled by the first initialization signal Init1. The main reference voltage line 1650 may be located in the bezel area BA. The main reference voltage line 1650 may be a line for supplying the reference voltage Vref to the subpixel SP.

A first emission transistor 1612 may be electrically connected between the main base voltage line 1660 and the auxiliary base voltage line 1670. The first emission transistor 1612 may be controlled by the first emission signal Em1. The main base voltage line 1660 may be located in the bezel area BA. The main base voltage line 1660 may be a line for supplying the base voltage EVSS to the subpixel SP.

The subpixel SP shown in FIG. 16 may be driven by the driving timings shown in FIGS. 18 to 24. Hereinafter, the driving of the subpixel SP shown in FIG. 16 will be described.

FIGS. 18 to 24 illustrate example driving timings of the initialization transistor 1611 and the emission transistor 1612 in Embodiment 2 shown in FIG. 16 in the display panel 110 according to aspects of the present disclosure.

A period during which the subpixel SP is driven may include an initialization period and an emission period.

Figure 18:
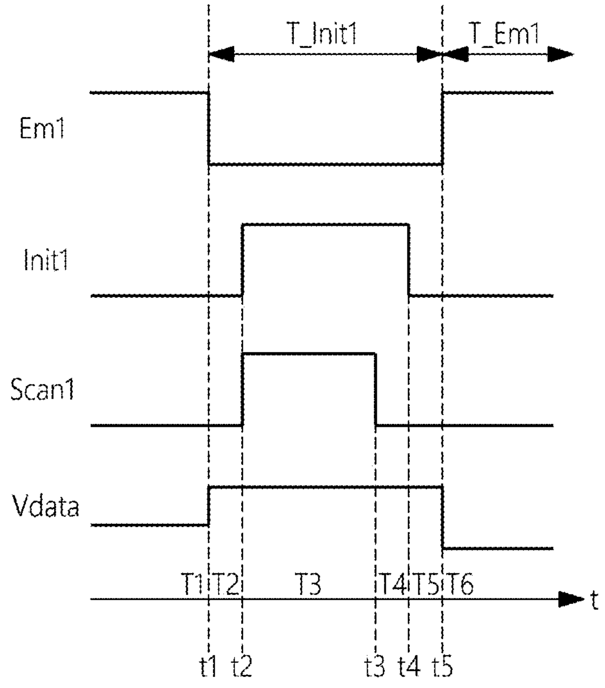
FIGS. 18 to 26 illustrate example driving timings of the initialization transistor and the emission transistor in Embodiment 2 in the display panel according to aspects of the present disclosure.

Referring to FIG. 18, the period during which the subpixel SP is driven may include a first initialization period T_Init1 and a first emission period T_Em1.

The first initialization period T_Init1 may be a period for preparation for enabling the subpixel SP to emit light.

The first emission period T_Em1 may be a period during which the subpixel SP emits light.

A period during which the subpixel SP is driven may include a first period T1, a second period T2, a third period T3, a fourth period T4, a fifth period T5, and a sixth period T6. An n-th period Tn may be a period from an (n−1)-th time to an n-th time. Here, n is a natural number of 1 or more. For example, referring to FIG. 8, the second period T2 may be a period from a first time t1 to a second time t2. The fifth period T5 may be a period from a fourth time t4 to a fifth time t5.

The first period T1 may be an emission period preceding the first initialization period T_Init1.

The second period T2 to the fifth period T5 may be included in the first initialization period T_Init1.

The sixth period T6 may be the first emission period T_Em1.

The first emission signal Em1 may have a high level during the first period T1 and the sixth period T6. The first emission signal Em1 may have a low level during the second period T2 to the fifth period T5.

The first initialization signal Init1 may have a low level during the first period T1, the second period T2, the fifth period T5, and the sixth period T6. The first initialization signal Init1 may have a high level during the third period T3 and the fourth period T4.

A first scan signal Scan1 may have a low level during the first period T1, the second period T2, the fourth period T4, the fifth period T5, and the sixth period T6. The first scan signal Scan1 may have a high level during the third period T3.

A data voltage Vdata may be supplied to the data line DL electrically connected to the first subpixel during the second period T2 to the fifth period T5.

Figure 19:
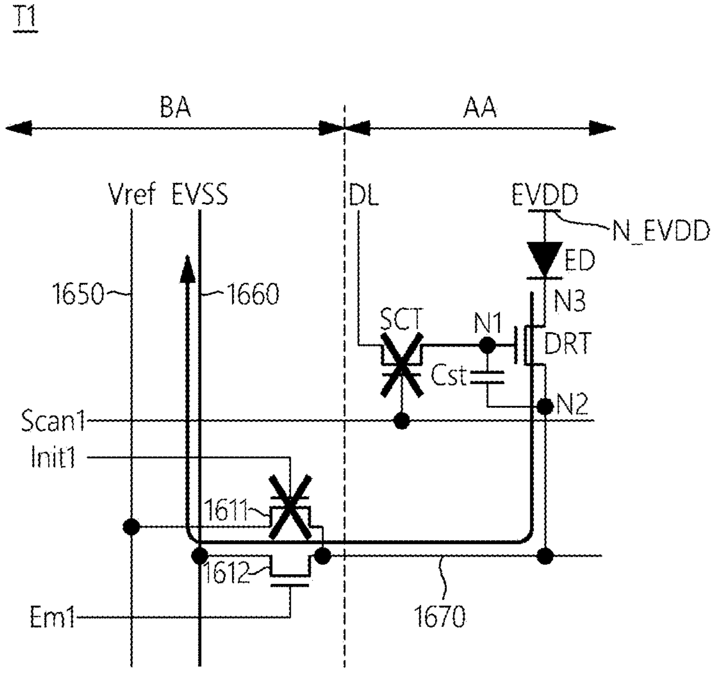

Referring to FIG. 19, the first period T1 may be an emission period preceding the first initialization period T_Init1. During the first period T1, the scan transistor SCT may be turned off, the initialization transistor 1611 may be turned off, and the emission transistor 1612 may be turned on. Since the emission transistor 1612 is turned on, the base voltage EVSS may be supplied to the source node of the driving transistor DRT. Thus, during the first period T1, the emission transistor 1612 can be turned on, and the base voltage EVSS can be supplied to the driving transistor DRT.

Figure 20:
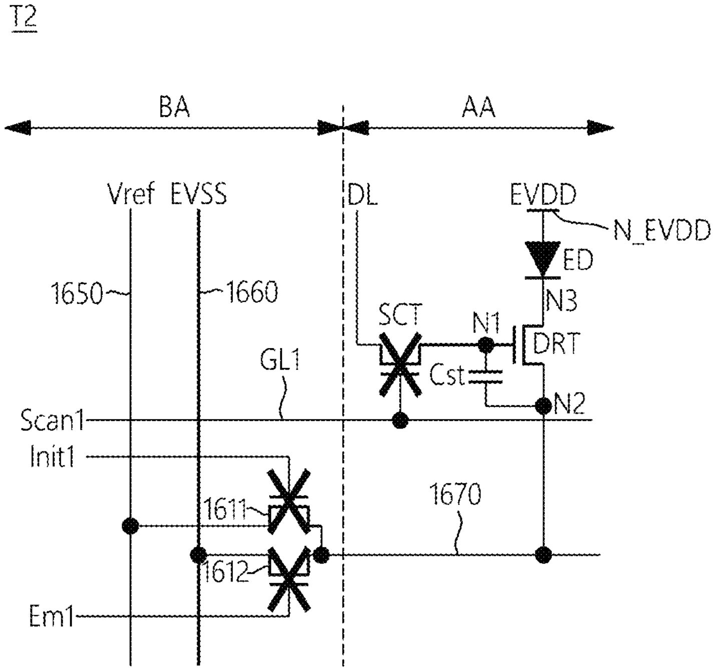

Referring to FIG. 20, the second period T2 may be a period in which the supply of the base voltage EVSS is interrupted, and the storage capacitor Cst charged with a certain level of voltage is discharged. During the second period T2, all of the scan transistor SCT, the initialization transistor 1611, and the emission transistor 1612 may be turned off. Since both the initialization transistor 1611 and the emission transistor 1612 are turned off during the second period T2, a short circuit by the concurrent supply of the base voltage EVSS and the reference voltage Vref can be prevented.

Figure 21:
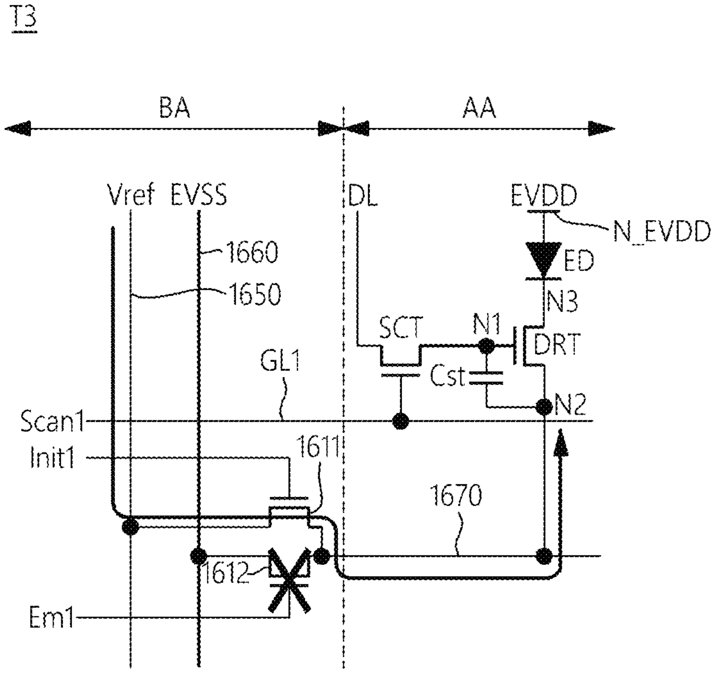

Referring to FIG. 21, the third period T3 may be a period during which the reference voltage Vref is supplied to the driving transistor DRT. During the third period T3, the scan transistor SCT and the initialization transistor 1611 may be turned on. During the third period T3, the emission transistor 1612 may be turned off. During the third period T3, the source node of the driving transistor DRT may be supplied with the reference voltage Vref, and at the same time, a data voltage Vdata may be supplied to the gate node of the driving transistor DRT. As the data voltage Vdata is supplied to the gate node of the driving transistor DRT, the storage capacitor Cst may be charged with a voltage for emission. A voltage equal to, corresponding to, a voltage difference between the data voltage Vdata and the reference voltage Vref may be stored in the storage capacitor Cst.

Figure 22:
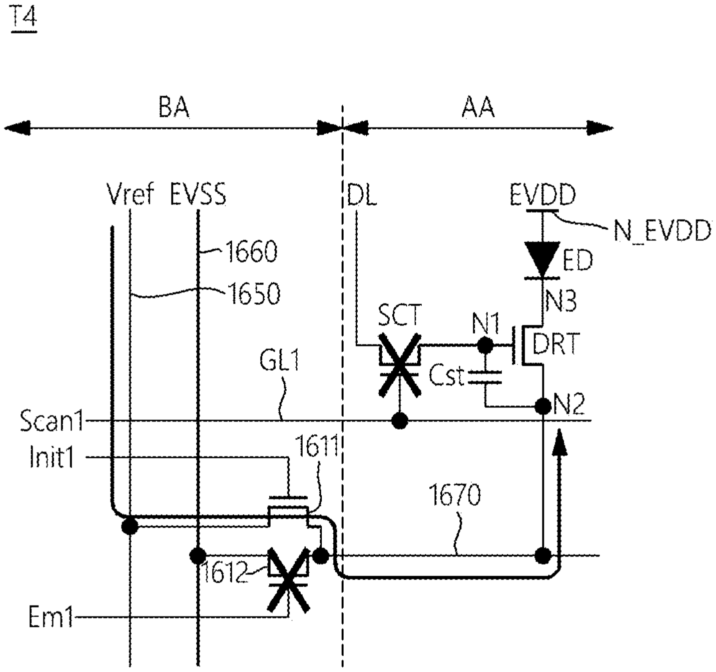

Referring to FIG. 22, the fourth period T4 may be a period for enabling the storage capacitor Cst to stably charge with a certain level of voltage. During the fourth period T4, the scan transistor SCT and the emission transistor 1612 may be turned off. During the fourth period T4, the initialization transistor 1611 may be turned on. The scan transistor SCT may be turned off before the initialization transistor 1611 is turned off. In a situation where the data voltage Vdata is supplied to one end of the storage capacitor Cst and the reference voltage Vref is supplied to the other end of the storage capacitor Cst, the supply of the data voltage Vdata may be interrupted first.

Figure 23:
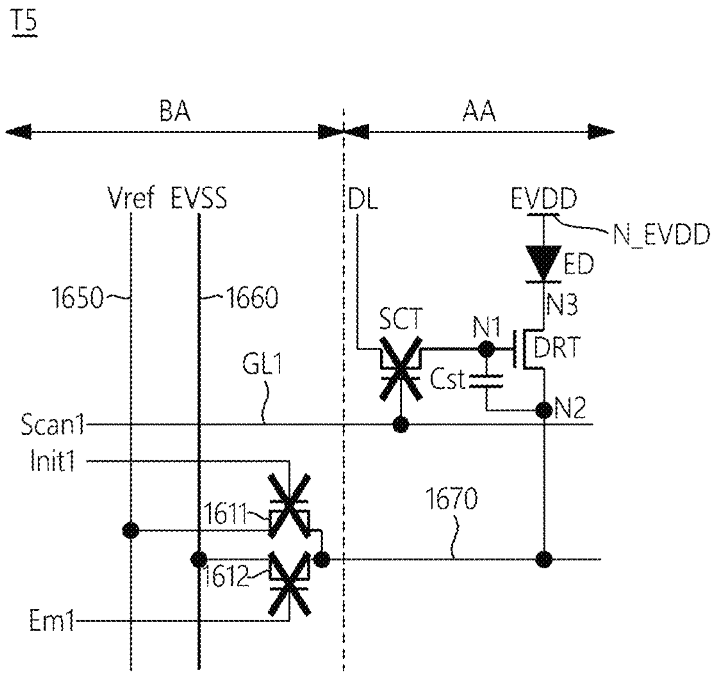

Referring to FIG. 23, the fifth period T5 may be a period in which the supply of the reference voltage Vref is interrupted, and the storage capacitor Cst charged with a certain level of voltage is discharged. During the fifth period T5, all of the scan transistor SCT, the initialization transistor 1611, and the emission transistor 1612 may be turned off. Since both the initialization transistor 1611 and the emission transistor 1612 are turned off during the fifth period T5, a short circuit by the concurrent supply of the base voltage EVSS and the reference voltage Vref can be prevented.

Figure 24:
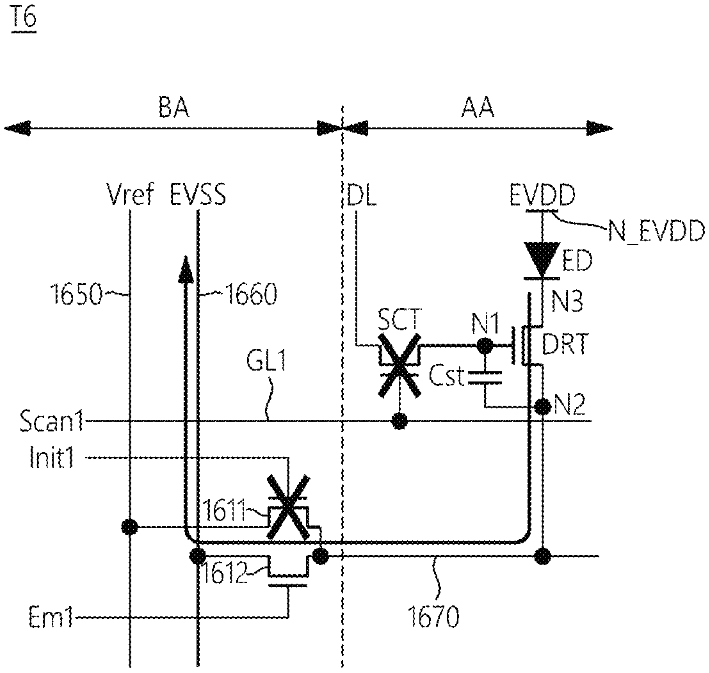

Referring to FIG. 24, the sixth period T6 may be a period during which the subpixel SP emits light. During the sixth period T6, the scan transistor SCT may be turned off, the initialization transistor 1611 may be turned off, and the emission transistor 1612 may be turned on. Since the emission transistor 1612 is turned on, the base voltage EVSS may be supplied to the source node of the driving transistor DRT. Thus, during the sixth period T6, the emission transistor 1612 can be turned on, and the base voltage EVSS can be supplied to the driving transistor DRT.

Unlike the configuration of FIG. 16, referring to FIG. 17, the gate node of the scan transistor SCT and the gate node of the first initialization transistor 1611 may be controlled simultaneously through one gate line. In this implementation, since the number of lines is reduced, the degree of circuit integration disposed in the display panel 110 can be improved.

Figure 25:
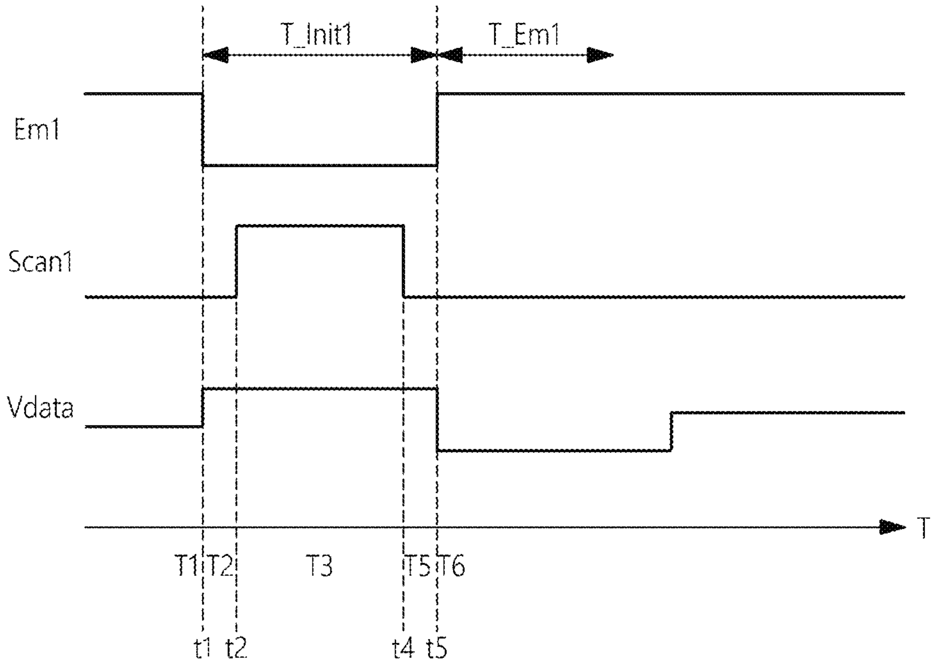

For example, a subpixel SP shown in FIG. 17 may be driven based on a timing diagram shown in FIG. 25. Referring to FIGS. 18 and 25, FIG. 25 illustrates that a first scan signal Scan1 is used, but a first initialization signal Init1 is not used. For example, as shown in FIG. 17, the gate node of the scan transistor SCT and the gate node of the first initialization transistor 1611 may be electrically connected to a first gate line GL1. In this example, the scan transistor SCT and the first initialization transistor 1611 may be controlled simultaneously by a first scan signal Scan1 supplied through the first gate line GL1. The above-described features are also applicable to the gate node of the initialization transistor 711 and the gate node of the scan transistor SCT shown in FIG. 7. That is, the gate node of the initialization transistor 711 and the gate node of the scan transistor SCT shown in FIG. 7 may be electrically connected to the same gate line.

As discussed above, the operation of a subpixel SP (i.e., the first subpixel SP1) included in a first column subpixel group (e.g., the first column subpixel group discussed in FIG. 5) has been described with reference to FIGS. 18 to 24. After the operation of the first column subpixel group is controlled, a second column subpixel group (e.g., the second column subpixel group discussed in FIG. 5) may be controlled. A portion of the period during which the first column subpixel group is operated and a portion of a period during which the second column subpixel group is operated may overlay with each other.

Figure 26:
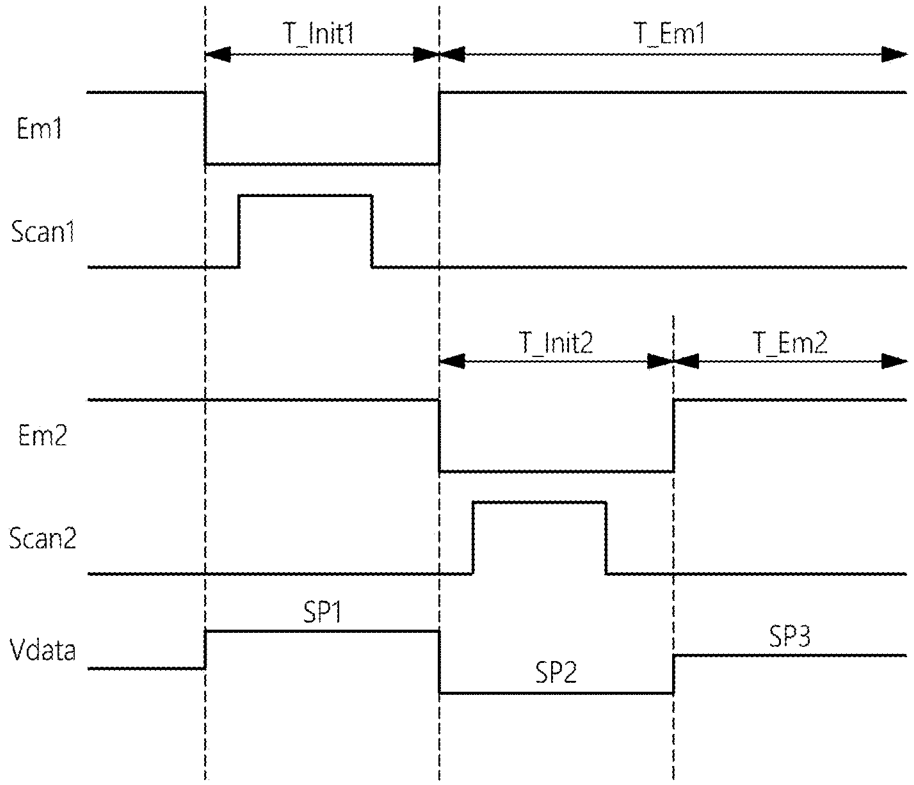

With respect to discussions on the timing diagram of FIG. 26, the first subpixel SP1 may be a subpixel included in the first column subpixel group, a second subpixel SP2 may be a subpixel included in the second column subpixel group, and a third subpixel SP3 may be a subpixel included in a third column subpixel group. The first subpixel SP1 may be connected to a first gate line, the second subpixel SP2 may be connected to a second gate line, and the third subpixel SP3 may be connected to a third gate line.

Referring to FIG. 26, a driving period of the first column subpixel group may include a first initialization period T_Init1 and a first emission period T_Em1. Referring to FIG. 26, a driving period of the second column subpixel group may include a second initialization period T_Init2 and a second emission period T_Em2.

During the first initialization period T_Init1, a data voltage Vdata may be a first data voltage supplied to the first subpixel SP1 included in the first column subpixel group. During the first emission period T_Em1, the first subpixel SP1 may emit light with luminance corresponding to the first data voltage. Referring to FIG. 26, when the first emission period T_Em1 is initiated, the second initialization period T_Init2 may also be initiated.

During the second initialization period T_Init2, a data voltage Vdata may be a second data voltage supplied to the second subpixel SP2 included in the second column subpixel group. During the second emission period T_Em2, the second subpixel SP2 may emit light with luminance corresponding to the second data voltage. Referring to FIG. 26, when the second emission period T_Em2 is initiated, a third initialization period may also be initiated.

During the third initialization period, a data voltage Vdata may be a third data voltage supplied to the third subpixel SP3 included in the third column subpixel group. During a third emission period, the third subpixel SP3 may emit light with luminance corresponding to the third data voltage.

Figure 27:
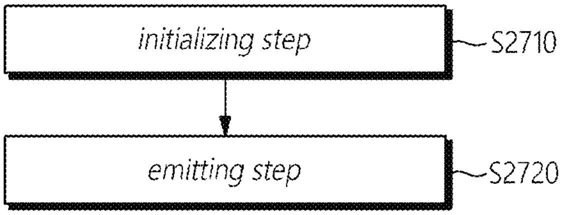
FIG. 27 is an example flowchart of a driving method of the display device according to aspects of the present disclosure.

FIG. 27 is an example flowchart of a driving method of the display device 100 according to aspects of the present disclosure.

The driving method of the display device 100 may include an initialization step S2710 and an emission step S2720.

The initialization step S2710 may be a stage for preparation for enabling a subpixel SP to emit light. During the initialization step S2710, a driving transistor DRT included in the subpixel SP may be supplied with a first voltage.

The emission step S2720 may be a stage in which the subpixel SP emits light. During the emission step S2720 following the initialization step S2710, the driving transistor DRT included in the subpixel SP may be supplied with a second voltage.

During the initialization step S2710, the driving transistor DRT may be supplied with the first voltage, and during the emission step S2720, the driving transistor DRT may be supplied with the second voltage. Accordingly, the threshold voltage of the driving transistor DRT can be stably controlled, and thus the quality of images displayed on the display panel 110 can be improved.

Various examples and aspects of the present disclosure are described below. These are provided as examples, and do not limit the scope of the present disclosure.

According to one or more aspects of the present disclosure, a display device may be provided that includes a display area in which a plurality of subpixels including a first subpixel are disposed, a bezel area different from the display area, a plurality of voltage lines disposed in the bezel area and including at least one driving voltage line and at least one base voltage line, and first and second switches disposed in the bezel area, the first switch being electrically connected between the base voltage line and the first subpixel, and the second switch being electrically connected between a first voltage line among the plurality of voltage lines and the first subpixel.

The first subpixel may include a driving transistor for driving a light emitting element, a scan transistor electrically connected between a first node and a data line, where the first node is, or corresponds to, a gate node of the driving transistor, and a storage capacitor electrically connected between a second node of the driving transistor and the first node. The first switch and the second switch may be electrically connected to the driving transistor.

Each of the first and second switches may include, or may be, a transistor. Each of the first and second switches may include, or may be, an initialization transistor or an emission transistor.

The first voltage line may be a driving voltage line.

The first switch and the second switch may be electrically connected to a drain node of the driving transistor.

The light emitting element may be electrically connected between the second node and a base voltage node.

The first voltage line may be a reference voltage line to which a reference voltage is supplied.

The first switch and the second switch may be electrically connected to a source node of the driving transistor.

The light emitting element may be electrically connected between a third node of the driving transistor and a driving voltage node.

A gate line electrically connected to a gate node of the scan transistor may be electrically connected to a gate node of an initialization transistor, which is the second switch.

A driving period of the subpixel may include an emission period during which the light emitting element emits light, and an initialization period during which the storage capacitor is charged with a data voltage. In the initialization period, the source node of the driving transistor may be initialized to a base voltage.

When the first switch is turned on, the second switch may be turned off, and when the second switch is turned on, the first switch may be turned off.

During an emission period during which the first subpixel emits light, an emission transistor, which is the second switch, may be turned on, and during an initialization period preceding the emission period, an initialization transistor, which is the first switch, may be turned on.

During the initialization period, a base voltage may be supplied to the first subpixel, and during the emission period, a driving voltage may be supplied to the first subpixel.

During an emission period during which the first subpixel emits light, an emission transistor, which is the first switch, may be turned on, and during an initialization period preceding the emission period, an initialization transistor, which is the second switch, may be turned on.

During the initialization period, a reference voltage may be supplied to the first subpixel through the first voltage line, and during the emission period, a base voltage may be supplied to the first subpixel.

The first switch and the second switch may be disposed in a first bezel area, and third and fourth switches different from the first and second switches may be disposed in a second bezel area different from first bezel area.

The plurality of subpixels may be disposed on a silicon substrate.

According to one or more aspects of the present disclosure, a driving method of a display device may include providing an initialization period during which a first switch disposed in a bezel area is turned on, and a first voltage is supplied to a first subpixel disposed in a display area, and providing an emission period during which a second switch disposed in the bezel area is turned on, a second voltage is supplied to the first subpixel, and the first subpixel emits light.

During the initialization period, a base voltage may be supplied through the first switch, and during the emission period, a driving voltage may be supplied through the second switch.

During the initialization period, a reference voltage may be supplied through the first switch, and during the emission period, a base voltage may be supplied through the second switch.

According to one or more aspects of the present disclosure, a display device may be provided that includes a display area, a bezel area different from the display area, a plurality of subpixels disposed in the display area and comprising a first subpixel, a plurality of voltage lines disposed in the bezel area and comprising a driving voltage line and a base voltage line, and first and second switches disposed in the bezel area. During a first period, the first switch may provide to the first subpixel a first voltage. During a second period, the second switch may provide to the first subpixel a second voltage.

The first voltage may be provided using a first voltage line among the plurality of voltage lines. The second voltage may be provided using a second voltage line among the plurality of voltage lines.

The first period and the second period may be an initialization period and an emission period, respectively.

The first and second switches may be connected to each other. The first and second switches may be connected directly to each other.

The first voltage may be a base voltage, and the second voltage may be a driving voltage.

The first voltage may be a reference voltage, and the second voltage may be a base voltage.

The first switch may include an initialization transistor, and the second switch may include an emission transistor.

The first voltage may be provided to a drain node of a driving transistor. The second voltage may be provided to a drain node of a driving transistor.

The above description has been presented to enable any person skilled in the art to make, use and practice the technical features of the present invention, and has been provided in the context of a particular application and its requirements as examples. Various modifications, additions and substitutions to the described embodiments will be readily apparent to those skilled in the art, and the principles described herein may be applied to other embodiments and applications without departing from the scope of the present invention. The above description and the accompanying drawings provide examples of the technical features of the present invention for illustrative purposes only. That is, the disclosed embodiments are intended to illustrate the scope of the technical features of the present invention.

What is claimed is:

1. A display device, comprising:

a display area in which a plurality of subpixels comprising a first subpixel are disposed;

a bezel area different from the display area;

a plurality of voltage lines disposed in the bezel area and comprising a driving voltage line and a base voltage line; and first and second switches disposed in the bezel area, wherein:

the first switch is electrically connected between the base voltage line and the first subpixel;

the second switch is electrically connected between a first voltage line among the plurality of voltage lines and the first subpixel;

the first subpixel comprises a driving transistor configured to drive a light emitting element;

a driving period of the first subpixel comprises an emission period and an initialization period preceding the emission period;

during the emission period, the light emitting element is configured to emit light;

during at least a part of the initialization period, when a data voltage is supplied to a gate node of the driving transistor, one of the first switch and the second switch is on;

during at least a second part of the initialization period, the data voltage is not supplied to the gate node of the driving transistor;

the at least a second part of the initialization period is after the at least a part of the initialization period and before the emission period;

during at least a third part of the initialization period, the data voltage is not supplied to the gate node of the driving transistor, and both of the first switch and the second switch are off; and the at least a third part of the initialization period is after a previous emission period and before the at least a part of the initialization period.

2. The display device of claim 1, wherein the first subpixel comprises:

a scan transistor electrically connected between a first node and a data line, wherein the first node is, or corresponds to, the gate node of the driving transistor; and a storage capacitor electrically connected between a second node of the driving transistor and the first node, and wherein the first switch and the second switch are electrically connected to the driving transistor.

3. The display device of claim 2, wherein:

the first voltage line is the driving voltage line;

the first switch and the second switch are electrically connected to a drain node of the driving transistor; and the light emitting element is electrically connected between the second node and a base voltage node.

4. The display device of claim 2, wherein:

the first voltage line is a reference voltage line that is configured to be supplied with a reference voltage;

the first switch and the second switch are electrically connected to a source node of the driving transistor; and the light emitting element is electrically connected between a third node of the driving transistor and a driving voltage node.

5. The display device of claim 2, wherein a gate line electrically connected to a gate node of the scan transistor is electrically connected to a gate node of an initialization transistor, which is the second switch.

6. The display device of claim 2, wherein during the emission period, the light emitting element is configured to emit light, and during at least a portion of the initialization period, the storage capacitor is configured to be charged with the data voltage, and wherein during at least a portion of the initialization period, a source node of the driving transistor is configured to be initialized to a base voltage.

7. The display device of claim 1, wherein during at least a portion of the initialization period, when the first switch is turned on, the second switch is turned off, and wherein during at least a portion of the initialization period, when the second switch is turned on, the first switch is turned off.

8. The display device of claim 7, wherein during the emission period, the first subpixel is configured to emit light, and an emission transistor, which is the second switch, is configured to be turned on, and wherein during at least a portion of the initialization period preceding the emission period, an initialization transistor, which is the first switch, is configured to be turned on.

9. The display device of claim 8, wherein during at least a portion of the initialization period, a base voltage is to be supplied to the first subpixel, and during the emission period, a driving voltage is to be supplied to the first subpixel.

10. The display device of claim 7, wherein during the emission period, the first subpixel is configured to emit light, and an emission transistor, which is the first switch, is configured to be turned on, and wherein during at least a portion of the initialization period preceding the emission period, an initialization transistor, which is the second switch, is configured to be turned on.

11. The display device of claim 10, wherein during at least a portion of the initialization period, a reference voltage is to be supplied to the first subpixel through the first voltage line, and during the emission period, a base voltage is to be supplied to the first subpixel.

12. The display device of claim 1, wherein the first switch and the second switch are disposed in a first bezel area, and third and fourth switches different from the first and second switches are disposed in a second bezel area different from first bezel area.

13. The display device of claim 1, wherein the plurality of subpixels are disposed on a silicon substrate.

14. The display device of claim 1, wherein:

during the at least a second part of the initialization period, both of the first switch and the second switch are off.

15. The display device of claim 14, wherein:

during at least a fourth part of the initialization period, the data voltage is not supplied to the gate node of the driving transistor, and one of the first switch and the second switch is on; and the at least a fourth part of the initialization period is after the at least a part of the initialization period and before the at least a second part of the initialization period.

16. The display device of claim 14, wherein:

the first subpixel further comprises a scan transistor electrically connected between a first node and a data line, wherein the first node is, or corresponds to, the gate node of the driving transistor;

during the at least a part of the initialization period, the scan transistor is on to supply the data voltage to the gate node of the driving transistor; and during the at least a second part of the initialization period, the scan transistor is off to not supply the data voltage to the gate node of the driving transistor, and both of the first switch and the second switch are off.

17. A driving method of a display device, the driving method comprising:

providing an initialization period, wherein during at least a portion of the initialization period, a first switch disposed in a bezel area is turned on, and a first voltage is supplied to a first subpixel disposed in a display area; and providing an emission period, wherein during the emission period, a second switch disposed in the bezel area is turned on, a second voltage is supplied to the first subpixel, and the first subpixel emits light, wherein:

the first subpixel comprises a driving transistor coupled to a light emitting element for emitting light;

during at least a part of the initialization period, a data voltage is supplied to a gate node of the driving transistor, and the first switch is on;

during at least a second part of the initialization period, the data voltage is not supplied to the gate node of the driving transistor;

the at least a second part of the initialization period is after the at least a part of the initialization period and before the emission period;

during at least a third part of the initialization period, the data voltage is not supplied to the gate node of the driving transistor, and both of the first switch and the second switch are off; and the at least a third part of the initialization period is after a previous emission period and before the at least a part of the initialization period.

18. The driving method of claim 17, wherein during at least a portion of the initialization period, a base voltage is supplied through the first switch, and during the emission period, a driving voltage is supplied through the second switch.

19. The driving method of claim 17, wherein during at least a portion of the initialization period, a reference voltage is supplied through the first switch, and during the emission period, a base voltage is supplied through the second switch.

20. A display device, comprising:

a display area;

a bezel area different from the display area;

a plurality of subpixels disposed in the display area and comprising a first subpixel;

a plurality of voltage lines disposed in the bezel area and comprising a driving voltage line and a base voltage line; and first and second switches disposed in the bezel area, wherein:

during a first period, the first switch is configured to provide to the first subpixel a first voltage using a first voltage line among the plurality of voltage lines;

during a second period, the second switch is configured to provide to the first subpixel a second voltage using a second voltage line among the plurality of voltage lines;

the first subpixel comprises a driving transistor configured to drive a light emitting element;

during at least a part of the first period, when a data voltage is supplied to a gate node of the driving transistor, the first switch is on;

during at least a second part of the first period, the data voltage is not supplied to the gate node of the driving transistor, and both of the first switch and the second switch are off; and the at least a second part of the first period is after the at least a part of the first period and before the second period;

during at least a third part of the first period, the data voltage is not supplied to the gate node of the driving transistor, and one of the first switch and the second switch is on; and the at least a third part of the first period is after the at least a part of the first period and before the at least a second part of the first period.

21. The display device of claim 20, wherein the first period and the second period are an initialization period and an emission period, respectively;

wherein the first and second switches are connected to each other; and wherein:

the first voltage is a base voltage, and the second voltage is a driving voltage; or the first voltage is a reference voltage, and the second voltage is the base voltage.

* * * * *